(12) United States Patent
Jones et al.

(10) Patent No.: US 8,364,310 B2
(45) Date of Patent: *Jan. 29, 2013

(54) ROBOT HAVING ADDITIONAL COMPUTING DEVICE

(75) Inventors: Joseph Lee Jones, Acton, MA (US);
Paul Eric Sandin, Brookline, NH (US);
Bryan Paul Adams, Jamaica Plain, MA (US)

(73) Assignee: iRobot Corporation, Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/314,556

(22) Filed: Dec. 8, 2011

(65) Prior Publication Data

US 2012/0083924 A1    Apr. 5, 2012

Related U.S. Application Data

(63) Continuation of application No. 11/832,616, filed on Aug. 1, 2007, now Pat. No. 8,095,238.

(60) Provisional application No. 60/867,772, filed on Nov. 29, 2006.

(51) Int. Cl.
*G06F 19/00* (2011.01)

(52) U.S. Cl. ........ 700/245; 700/246; 700/249; 700/258; 318/568.12

(58) Field of Classification Search .................. None
See application file for complete search history.

(56) References Cited

U.S. PATENT DOCUMENTS

| | | | | |
|---|---|---|---|---|
| 5,075,853 | A | * | 12/1991 | Luke, Jr. .......................... 701/25 |
| 5,920,678 | A | * | 7/1999 | Watanabe et al. ............. 700/255 |
| 6,816,753 | B2 | * | 11/2004 | Sakamoto et al. ............ 700/245 |
| 6,868,181 | B1 | * | 3/2005 | Feiten et al. ................... 382/181 |
| 7,042,185 | B2 | * | 5/2006 | Yang et al. ............... 318/568.18 |
| 2002/0137427 | A1 | * | 9/2002 | Peters et al. .................. 446/454 |
| 2003/0097202 | A1 | * | 5/2003 | Fujita et al. ................... 700/245 |
| 2003/0114959 | A1 | * | 6/2003 | Sakamoto et al. ............ 700/245 |
| 2004/0083274 | A1 | * | 4/2004 | Katiyar et al. ................ 709/217 |
| 2004/0182614 | A1 | * | 9/2004 | Wakui ............................ 180/7.1 |
| 2004/0224676 | A1 | * | 11/2004 | Iseki ............................. 455/420 |
| 2005/0162119 | A1 | * | 7/2005 | Landry et al. ................ 318/580 |
| 2005/0218852 | A1 | * | 10/2005 | Landry et al. ................ 318/580 |
| 2005/0234592 | A1 | * | 10/2005 | McGee et al. ................ 700/245 |

(Continued)

OTHER PUBLICATIONS

Office Action dated Jul. 22, 2010 for Related U.S. Appl. No. 11/832,616.
Office Action dated Feb. 17, 2011 for Related U.S. Appl. No. 11/832,616.
Office Action dated Sep. 8, 2011 for Related U.S. Appl. No. 11/832,616.

*Primary Examiner* — Khoi Tran
*Assistant Examiner* — Jonathan L Sample
(74) *Attorney, Agent, or Firm* — Honigman Miller Schwartz and Cohn LLP

(57) ABSTRACT

A modular robot development kit includes an extensible mobile robot platform and a programmable development module that connects to the mobile robot platform. The mobile robot platform includes a controller that executes robot behaviors concurrently and performs robot actions in accordance with robot control signals received from the development module, as modified by the concurrently running robot behaviors, as a safeguard against performing potentially damaging robot actions. Also, the user can develop software that is executed on the development module and which transmits the robot control signals to the mobile robot platform over the data communication link using a robot interface protocol. The robot interface protocol encapsulates potentially harmful user-developed software routines from the controller instructions executed by the controller of the mobile robot platform, while nonetheless enabling the user to effectively control the mobile robot platform using the robot control signals of the robot interface protocol.

20 Claims, 26 Drawing Sheets

U.S. PATENT DOCUMENTS

| | | | |
|---|---|---|---|
| 2006/0049790 A1* | 3/2006 | Yang et al. | 318/568.12 |
| 2007/0016328 A1* | 1/2007 | Ziegler et al. | 700/245 |
| 2007/0042716 A1* | 2/2007 | Goodall et al. | 455/67.11 |
| 2007/0061040 A1* | 3/2007 | Augenbraun et al. | 700/245 |
| 2007/0061043 A1* | 3/2007 | Ermakov et al. | 700/263 |
| 2007/0073439 A1* | 3/2007 | Habibi et al. | 700/213 |
| 2007/0074182 A1* | 3/2007 | Hinchey et al. | 717/136 |
| 2007/0156286 A1* | 7/2007 | Yamauchi | 700/245 |
| 2007/0192910 A1* | 8/2007 | Vu et al. | 901/17 |
| 2007/0244599 A1* | 10/2007 | Tsai et al. | 700/245 |

* cited by examiner

ROBOT HAVING ADDITIONAL COMPUTING DEVICE

CROSS-REFERENCE TO RELATED APPLICATION

This is a continuation application of U.S. Non-Provisional patent application Ser. No. 11/832,616, filed Aug. 1, 2007 now U.S. Pat. No. 8,095,238, which claims priority to U.S. Provisional Patent Application Ser. No. 60/867,772, filed Nov. 29, 2006. The entire disclosure of both applications is incorporated herein by reference.

FIELD

The present disclosure relates to a robot development platform, such as a robot development kit, for facilitating alteration or modification of components and software included in a provided robot platform.

BACKGROUND

There exist a number of robot development kits within the field of robotics. Most kits provide the user with the base components necessary to build a robot including: wheels, a motor, a body, sensors and a processor. Kits typically require that the user build a bottom up software architecture that inputs sensor data, converts the sensor data into a logical format, performs control routines and sends commands to the motor. While such kits provide the user with the flexibility to design and create a custom robot, such kits also require extensive knowledge of robot mechanics, motor assembly, and machine software. The requirement that a user be familiar with such knowledge excludes a segment of potential users from being able to develop a robotic device to learn about robots.

There is a demand for a robotic development kit which provides a user with a basic robot that is already assembled and programmed, but that can be modified and expanded. While kits such as this exist, these kits are often either expensive, require that the user create low level programs to interpret sensor data and convert drive commands, provide undesirable expansion methods, or provide little safe guarding against destruction of the robot. An example of such a robot is one that provides a robot base with pre-programmed behaviors able to be altered and an expansion platform located on top of the robot's body. Such a robot includes a base with a motor, wheels and a basic sensor suite.

The expansion platform is located on top of the robot's body and includes mounting apparatus able to support a payload. Further features include a number of pre-programmed behaviors that form a deliberative software architecture able to respond to sensor output. The pre-programmed behaviors are included within a core software system able to the user and able to be deleted and that does not provide access to the level of software which converts native sensor data into logical values and the level of software which converts virtual drive commands into motor drive commands.

A robot such as the one discussed above typically does not include an expansion platform within the volume of the robot's main body and so absent user data input that specifies the dimensions of the payload; the robot is unable to know the width or length of its main body. This is a disadvantage because the robot is likely to avoid situations where the robot's body will become stuck. Additionally, while a deliberative software architecture provides a way of implementing behaviors, it is not an architecture that implements a behavior based system and so the user is unable to review and imitate actions present in such a system. Also, there exists a greater risk that the user will detrimentally alter the core software because the user is able to modify and delete the core software on the robot.

This risk can lead to errors in robot operation or anomalies in user created programs which further cause the robot to move in unexpected directions that cause the robot to be damaged. Additionally, it is markedly more difficult to program such a robot because the user must create their own set of routines able to convert native sensor data into logical values and able to convert virtual drive commands into native motor controls. Furthermore, the lack of a safe mode results in full control over the movement of the robot which can result in unexpected behaviors that cause the robot to drive over cliffs and may cause damage to the robot.

SUMMARY

In view of the above, the present disclosure advantageously relates to a robot development platform that facilitates modification of robot components and/or software control routines, while reducing the risk of catastrophic hardware or software malfunction resulting from the modification process. Various non-limiting examples of robots, robot development kits, or related technologies are described herein, illustrating various features or advantages associated with the present disclosure. The following is a brief summary of at least some of the examples discussed in this disclosure.

An autonomous robot development platform, having a chassis including: a differential drive including two differentially driven wheels, a proximity sensor directed toward a forward end of the chassis, a cliff sensor positioned toward the forward end of the chassis, a switch proximate a caster, and a sensor circuit connected to the proximity sensor, to the cliff sensor and to the switch; an I/O circuit including one or more input and one output; a control circuit connected to the differential drive, to the sensor circuit and to the I/O circuit and including a microprocessor; a bed formed in the chassis between the two differentially driven wheels and extending from the top to the bottom of the chassis, such that the robot's center of gravity is located within the perimeter of the bed; a communication port provided within the bed, connected to the I/O circuit, and capable of receiving and transmitting responses to the formatted commands; one or more mounts formed within the walls of the bed for mounting one or more payloads to the bed; and a command interpreter routine executed by the control circuit to receive formatted commands and responds by initiating a serial input handler that then communicates with the differential drive, the I/O circuit, the sensor circuit, and the communication port.

An autonomous robot development platform, having a chassis including: a differential drive including two differentially driven wheels, a proximity sensor directed toward a forward end of the chassis, a cliff sensor positioned toward the forward end of the chassis, a switch proximate a caster, and a sensor circuit connected to the proximity sensor, to the cliff sensor and to the switch; an I/O circuit including one or more input and one output; a control circuit connected to the differential drive, to the sensor circuit and to the I/O circuit and including a microprocessor; a bed formed in the chassis between the two differentially driven wheels and extending from the top to the bottom of the chassis, such that the robot's center of gravity is located within the perimeter of the bed, and that further includes: a communication port provided within the bed and connected to the I/O circuit, one or more mounts formed within the walls of the bed and useful for mounting payloads and apparatus to the bed, a detachable wall connected to the bed, located toward the rear of the chassis, and able to contain payloads installed within the bed when attached; and a bumper attached to the chassis, directed toward a forward end of the chassis and further including proximity sensors able to detect the angle at which the bumper collides with an obstacle.

An autonomous robot development platform, having a chassis including: a differential drive including two differentially driven wheels, a proximity sensor directed toward a forward end of the chassis, a cliff sensor positioned toward the forward end of the chassis, a switch proximate a caster, and a sensor circuit connected to the proximity sensor, to the cliff sensor and to the switch; an I/O circuit including one or more input and one output; a control circuit connected to the differential drive, to the sensor circuit and to the I/O circuit and including a microprocessor; a bed formed in the chassis between the two differentially driven wheels and extending from the top to the bottom of the chassis, such that the robot's center of gravity is located within the perimeter of the bed; a communication port provided within the bed, connected to the I/O circuit, and capable of receiving and transmitting responses to the formatted commands; a bed with one or more topographies able to support payloads installed within the bed and created by forming within the bed: circular raised bosses arranged at a predetermined pitch, elongated raised bosses arranged at a predetermined pitch, holes with a uniform diameter and arranged at a predetermined pitch, mounts for attaching a table with an alternative surface topography, mounts for attaching an external payload to the bed, and mounts for attaching external apparatus to the bed; and a command input routine executed by the control circuit to receive formatted commands and responds by initiating a serial input handler that then communicates with the I/O circuit, virtual sensors and behavior software included within the microprocessor.

An autonomous robot development platform, having a chassis including: a differential drive including two differentially driven wheels, a proximity sensor directed toward a forward end of the chassis, a cliff sensor positioned toward the forward end of the chassis, a switch proximate a caster, and a sensor circuit connected to the proximity sensor, to the cliff sensor and to the switch; an I/O circuit including one or more input and one output; a control circuit connected to the differential drive, to the sensor circuit and to the I/O circuit and including a microprocessor; a bed formed in the chassis between the two differentially driven wheels and extending from the top to the bottom of the chassis, such that the robot's center of gravity is located within the perimeter of the bed; a communication port provided within the bed, connected to the I/O circuit, and capable of receiving and transmitting responses to the formatted commands; one or more mounts formed on the base of the bed including: mounts for attaching a table with an alternative surface topography, mounts for attaching an external payload to the bed, and mounts for attaching external apparatus to the bed; and a command input routine executed by the control circuit to receive formatted commands and responds by initiating a serial input handler that then communicates with the I/O circuit, virtual sensors and behavior software included within the microprocessor.

An autonomous robot development platform, having a motorized drive including a drive virtualization level; one or more of an obstacle sensor including a sensor virtualization level; a command input routine that relays data command packets to serial input handlers which can interpret the header arguments of data command packets and responsively do one or both of: (i) call sensor virtualization routines that retrieve and format native sensor data into logic levels, and (ii) call drive virtualization functions that retrieve and format bearing and speed navigation instructions into native motor controls.

An autonomous robot development platform, having a command interface that receives external commands, each external command including a header argument, and converts external commands into internal control values; a sensor virtualization level that includes one or more virtual sensor functions which correspond to a sensor such that the virtual sensor functions: retrieves native sensor data, and converts the native sensor data into sensor logic levels relative to the native sensor data; a drive virtualization level that includes one or more virtual drive functions that converts the sensor logic levels and the internal control values into a set of native motor controls.

A behavior based robot development platform, having a motorized drive including a drive virtualization level; a command input routine that relays commands to serial input handlers which can interpret the header arguments of communication data packets and responsively call sensor virtualization routines that retrieve and format native sensor data into logic levels; a set of predefined behaviors each behavior being a finite state machine including: a routine that monitors sensor virtualization function output and the serial input handlers for events, a routine that actuates one or more virtual drive functions that convert bearing and speed navigation instructions into raw motor controls, and a routine that responds to an arbiter to allow the behavior to operate the virtual drive functions, the set including an obstacle avoidance behavior that monitors an obstacle sensor virtualization function output, actuates one or more virtual drive functions that move the robot substantially away from the obstacle, and that provides telemetry regarding the detection and avoidance of the obstacle.

A behavior based robot development platform, having a motorized drive including a drive virtualization level; a command input routine that relays serial commands to serial input handlers which can interpret the header arguments of serial commands and responsively calls virtual sensor routines that retrieve and format native sensor data into logic levels; a set of predefined behaviors each behavior being a finite state machine including: a routine that monitors sensor virtualization function output and the serial input handlers for events, a routine that actuates one or more virtual drive functions that convert bearing and speed navigation instructions into native motor controls, a routine that responds to an arbiter that allows the behavior to operate the virtual drive functions, and a set of modes each mode representative of a state which the development platform can operate in, and able to run in parallel with one or more of the other modes.

A modular robot, having a mobile robot platform including a sensor, a drive train, an on-board controller, an expansion bay, and a data communication port, the on-board controller including a first set of computer software instructions that can communicate via the first data communication port in accordance with a predetermined robot interface protocol, to receive and process input from the sensor, to operate the mobile robot platform in accordance with one or more robot behaviors, and to operate the mobile robot platform to perform one or more robot actions; and a development module that can detachably interface with the mobile robot platform and including a programmable processor, another data communication port that can interface with the first data communication port of the mobile robot platform, and a computer memory, in which the development module includes a second set of computer software instructions that can transmit a first robot control signal to the mobile robot platform in accordance with the robot interface protocol, the first robot control signal corresponding to one or more robot actions or robot behavior, in which the mobile robot platform can perform the robot behavior corresponding to the first robot control signal, in which the development module includes a third set of computer software instructions that can transmit a second robot control signal querying the sensor of the mobile robot platform in accordance with the robot interface protocol and to receive sensor data from the mobile robot platform, and in which the mobile robot platform can receive a sensor reading from the sensor, generate the sensor data based on the sensor reading, and transmit the sensor data to the development module in accordance with the robot interface protocol.

Another example may be similar to the above, but also in which the data ports can communicate in accordance with a serial data communication protocol such as, for example, RS-232, USB, IEEE 1394, or $I^2C$.

Another example may be similar to the above, but also in which the robot behaviors can operate the mobile robot platform autonomously of the development module.

Another example may be similar to the above, but further in which the mobile robot platform also has two or more differentially driven drive wheels that can propel the mobile robot platform and are disposed at two or more laterally opposed positions on the mobile robot platform across a central longitudinal axis of the mobile robot platform; and an expansion bay having a lateral position substantially between the two or more wheels.

Another example may be similar to the above, also having an auxiliary component including one or more of a sensor or an actuator and that can connect to the mobile robot platform substantially within the expansion bay.

Another example may be similar to the above, in which the auxiliary component communicates with the development module in accordance with the robot interface protocol.

Another example may be similar to the above, in which the robot interface protocol has a first set of datagrams each that can operate the mobile robot platform according to a corresponding robot action; and a second set of datagrams that can establish communication in accordance with the robot interface protocol.

Another example may be similar to the above, in which the robot interface protocol further includes a datagram that can override one or more of the robot behaviors.

Another example may be similar to the above, in which at least one of the sets of computer software instructions of the development module is generated by a user using a computer programming language and installed to the development module by the user.

Another example may be similar to the above, in which the robot interface protocol does not include a datagram capable of altering the first set of computer instructions on the mobile robot platform.

Another example may be similar to the above, in which the robot behaviors include one or more safety behavior that can prevent the mobile robot platform from performing a robot action that damages the mobile robot platform.

Another example may be similar to the above, in which the on-board controller of the mobile robot platform can execute one or more robot behaviors concurrently, in which the first set of computer software further includes an arbitration routine that can select one robot behavior among the concurrently executed robot behaviors based on a priority determination routine, and in which the on-board controller can control the mobile robot platform based on the selected robot behavior.

Another example may be similar to the above, in which the first robot control signal transmitted by the development module can alter the selection of the arbitration routine.

Another example may be similar to the above, further having one or more parameterized navigational operations having one or more quantitative parameters, in which the robot interface protocol includes a predetermined specification for transmission of the one or more quantitative parameters corresponding to the parameterized navigational operation.

Another example may be similar to the above, in which the first robot control signal includes a parameterized navigational operation, in which the on-board controller of the mobile robot platform can also process the first robot control signal transmitted by the development module and control the drive train in accordance with the first robot control signal.

DETAILED DESCRIPTION

As used herein, the term "boss" is understood to include a substantially symmetrical, raised area or protrusion on a substantially flat area. Also, with regard to obstacles referred to herein, a positive obstacle can be detected based upon collision with the obstacle, proximately sensing the obstacle or detecting reflections of ambient beams emanating from the obstacle, or projected beams bouncing off the obstacle.

Example beams may include: projected light beams, projected sound beams, or ambient light beams. One example of a positive obstacle is a wall which obstructs the passage of an object when that object collides with the wall, and reflects beams projected onto the wall's surface. A negative obstacle is an area typically characterized as a hole or a break within a detected surface that fails to obstruct the passage of obstacles or beams that come in contact with the area. One example of a negative obstacle is an open doorway which fails to reflect beams projected towards it and fails to obstruct the progress of an object as the object moves towards it.

Figure 1:
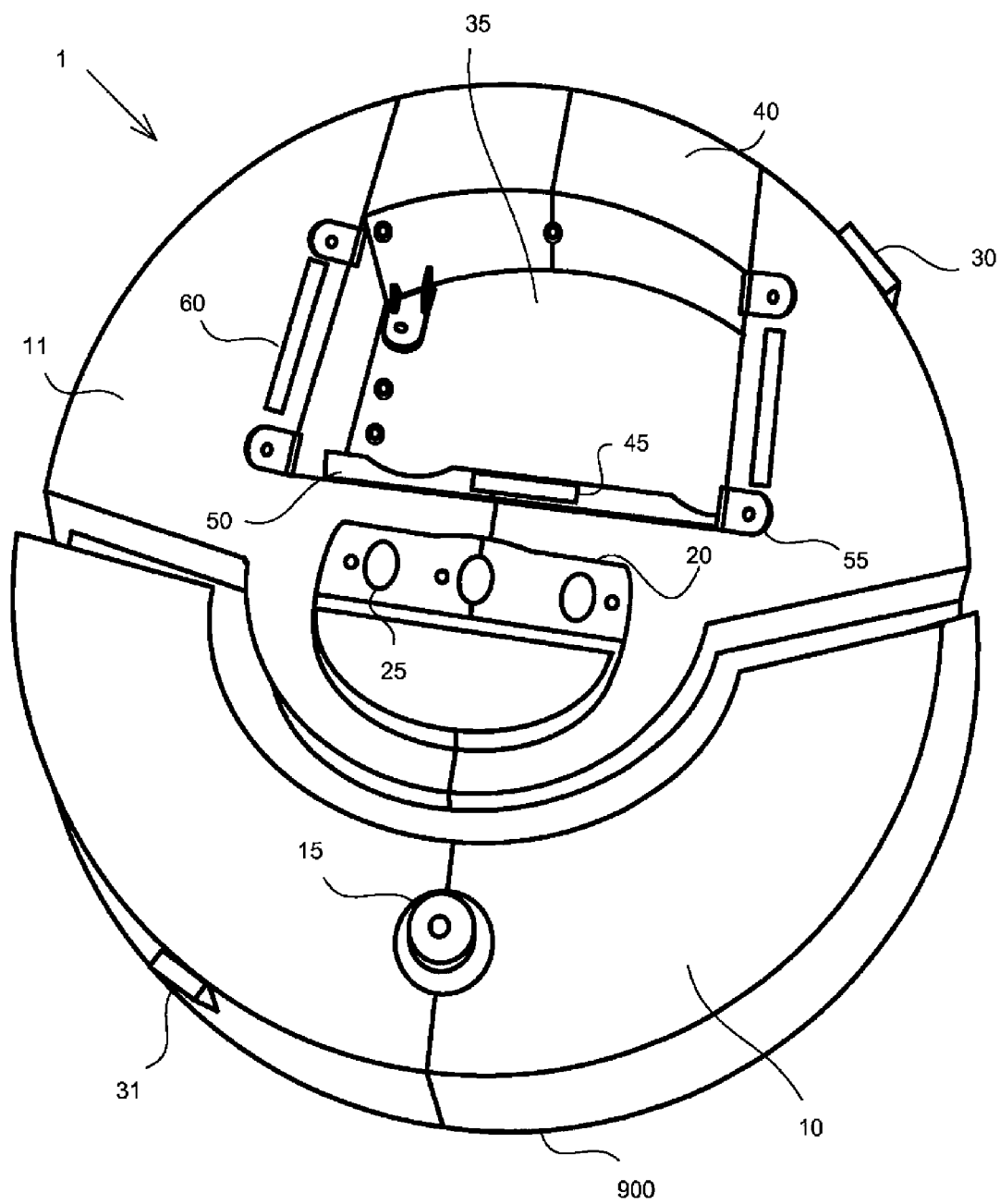
FIG. 1 is a top view of a schematic representation of a robot development kit.

The following examples provide an overview of a robot development platform, which may include a robot development kit as discussed below. In accordance with a first example, as illustrated in FIG. 1, a robot 1 has a housing structure 900 including a main body 11 connected to a bumper 10 that is positioned towards the front of the chassis 103, including a bed 35 located towards the rear of the housing structure 900 and including a removable rear wall 40. The bumper 10 is mounted onto the chassis 103, is connected to the main body 11, and is connected to a bump detect sensor 322 (see FIG. 7, for example). It is preferable that the bumper 10 have a fixed height and be permanently attached to the main body 11.

Alternatively, the bumper 10 may be detachable from the main body 11 so that different bumpers of varying heights and widths can be attached in place of the original bumper 10. Additionally, the bumper 10 may be included within the main body 11 of the robot as opposed to being a separate component attached to the main body 11. Further alternatives include a bumper 10 attached to the main body 11 and with an adjustable height. Such a bumper 10 is beneficial to extend beyond the volume created by the main body 11 to protect a payload attached to the bed 35, when the payload extends beyond the volume created by the main body 11. The bumper 10 also advantageously includes an infrared emitter and detector 15 positioned towards the front of the bumper 10 and located on top of the bumper 10 which can be used as an emitter and detector 15 within homing applications. Other versions of the bumper 10 may alternatively not include an infrared emitter and detector.

The main body 11 is mounted onto the chassis 103 and connected to the bumper 10, and to the rear wall 40. While it is preferred that the rear wall 40 is detachable, other versions may have a rear wall 40 permanently attached to the main body 11. It is preferred that the main body 11 include a control panel 20 with controls 25 installed on the main body 11, positioned toward the front of the chassis 103, and operable to send user commands to the control circuit 304. In the alternative, the main body 11 may not include a control panel 20, or may include a control panel 20 that is connected to the communication port 302 and is operable to send user commands to payloads connected to the communication port 302. Located on the side of the main body 11 is a plug 31 connected to the charging circuit 314, and a port 30 connected to the I/O circuit 300. Alternative versions may not include a port 30 installed on the side of the main body 11 and connected to the I/O circuit 300, or having a plug 31 positioned toward the rear of the chassis 103.

Further referring to FIG. 1, the main body 11 includes a bed 35 that extends from the front of the main body toward the rear edge of the main body so that the robot's center of gravity is within the bed 35. The advantage of having a bed 35 where the center of gravity is included within it, is that one can install payloads with varying weight onto the bed without being required to adjust the payload weight for changes in the robot's center of gravity. The bed 35 is preferably located completely within the volume created by the main body 11 and is positioned within the volume created between the two differentially driven wheels 112, 110.

A particular advantage of positioning the bed 35 entirely within the volume of the main body 11 is that the robot can calculate with a degree of certainty the dimensions of the robot's entire width and height. When payloads installed in the bed 35 are included entirely within the bed 35 volume, a further advantage of a robot that knows the width and height of the robot's entire body 11 is that the robot can avoid driving in a direction or at an angle that will cause the robot to become stuck. It is advantageous to include the bed 35 between the two wheels 112, 110 because such a configuration allows the user to place payloads of varying weights within the bed 35 and without altering the robot's center of gravity. An alternative to a bed 35 included completely within the volume of the main body 11 is a bed 35 that may extend above or out from the main body 11.

Further referring to FIG. 1, there are elongated raised bosses 60 positioned on the top of the main body 11 and located along the perimeter of the bed 35. The elongated raised bosses 60 preferably have a length and width capable of supporting payloads mounted onto the elongated raised bosses 60. Additionally, there are marked indicia 55 positioned on top of the main body 11 and located along the perimeter of the bed 35, and proximate to the raised bosses 60. The marked indicia 55 are able to receive fasteners and to support payloads attached to the main body 11 with a fastener inserted into the marked indicia 55.

As alternatives to the combination of elongated raised bosses 60 and marked indicia 55, there may be a collection of marked indicia 55 only, located along the perimeter of the bed 35, or a collection of elongated raised bosses 60 only, located along the perimeter of the bed 35. It is advantageous to include a combination of marked indicia 55 and elongated raised bosses 60 on the main body 11 and proximate to the perimeter of the bed 35 because such a combination provides support for payloads attached onto the main body 11 or installed within the bed 35.

Further referring to FIG. 1 the rear wall 40 is located along the rear perimeter of the bed 35, is positioned toward the rear of the structure, and is connected to the bed 35 and to the main body 11. The rear wall 40 can detach from the bed 35 and the main body 11 and the rear wall 40 can securely reattach to the bed 35 and to the main body 11. An advantage of a detachable rear wall 40, is that the rear wall 40, when attached, contains objects placed within the bed 35 and supports payloads attached to the bed 35 and to the main body 11. Furthermore, when detached the rear wall 40 provides the advantage of allowing payloads and apparatus that extend beyond the length of the bed 35 to be installed into the bed. Moreover, a detachable rear wall 40 allows a payload that extends beyond the dimensions of the bed 35 and the main body 11, to be installed within the bed 35 or onto the main body 11. Alternatively, the rear wall 40 can be permanently attached to the bed 35 and to the main body 11.

Further referring to FIG. 1, the bed 35 is located toward the rear of the main body 11 and is connected to the chassis 103, and to the I/O circuit 300 through a communication port 45 included within the bed 35. A shelf 50 having three walls that are flush with the three walls of the bed 35 and having a floor that is flush with the floor of the bed 35, is included within the bed 35. Other versions of the bed 35 may not include a shelf 50, but rather will have a floor that extends a uniform height over the entire area created by the four walls of the bed 35. The communication port 45 is installed in the shelf 50 which is connected to the bed 35, and to the I/O circuit 300.

One advantage of including a communication port 45 that is connected to an I/O circuit 300 as opposed to a microprocessor 312, is a reduction in the risk that the integrity of pre-programmed software included on the microprocessor 312 will be compromised by a user's actions. Included within the communication port 45 is a plug able to support a twenty-five pin connector. It is particularly advantageous to include a plug within the communication port 45 because including a plug that is already connected both physically and electrically to the communication port 45 eliminates the requirement that a user provide and install the wiring necessary to create a physical connection and electrical connection between an external computing apparatus and the communication port 45. The bed floor 51 is attached to the bed 35, and is located within the volume created by the chassis 103 and within the volume of the main body 11.

Figure 2:
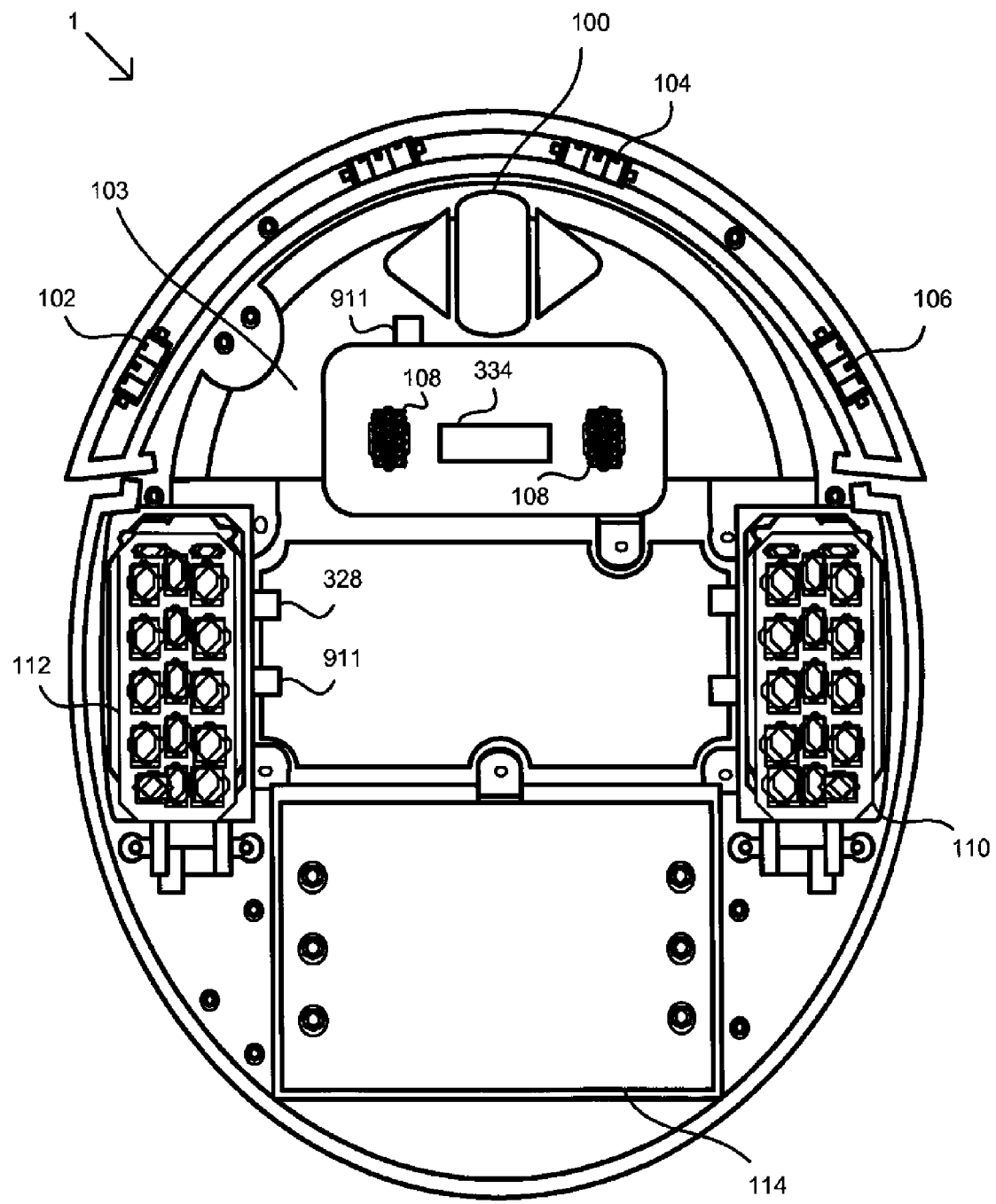
FIG. 2 is a bottom view of a schematic representation of a robot development kit.

The bottom of the main body 11 is illustrated in FIG. 2 and includes two differentially driven wheels 112, 110 located on the outer edges of the chassis 103, sensors 102, 104, 106 located on the main body 11, a caster wheel 100 positioned toward the front of the structure, and a set of odometry wheels 108 positioned proximate to the middle of the structure. The chassis 103 is included within the volume of the bottom of the main body 11 and extends along the perimeter of the main body and into the middle of the main body. The differentially driven wheels 112, 110 are connected to the chassis 103, to the motor assembly 310, to the wheel drop sensor 330, to the stasis sensor 328, and to the odometry sensor 334.

It is advantageous to provide a user with differentially driven wheels 112, 110 because such wheels provide the robot with more degrees of freedom than a robot with wheels installed on a single axis and wheels connected to a single motor. Sensors 102, 104, 106 are positioned along the perimeter of the structure and connected to the sensor circuit 306. The sensors 102, 104, 106 include sensor assemblies able to detect the proximity of an object and are advantageously positioned along the bottom front perimeter of the main body 11 so that as the robot moves in a forward direction and toward a cliff, the sensors 102, 104, 106 detect the cliff before the robot's center of gravity moves over the cliffs edge. Furthermore, the sensors 102, 104, 106 are positioned so that the sensors 102, 104, 106 are able to detect the cliff before the robot's center of gravity moves over the cliffs edge, regardless of the angle at which the robot moves forward and toward the cliff.

Alternatively, sensors 102, 104, 106 may be placed at a plurality of positions along the bottom perimeter of the main body 11 so that the robot is able to detect a cliff as the robot moves either forward or backward toward the cliff. The caster wheel 100 is located toward the front of the main body 11 and proximate to the perimeter of the main body 11, and is connected to the wheel drop sensor 330, and to the chassis 103. The caster wheel 100 provides the robot with additional support and further increases the degrees of freedom that the robot can move. Further connected to the chassis 103 are a set of odometry wheels 108 that are also connected to the odometry sensor 334. The area 114 towards the rear of the main body 11 is positioned within the volume created by the bottom of the bed 35 and preferably includes the robot's center of gravity. Alternative arrangements may include alternative sensor assemblies within the area 114.

Figure 3A:
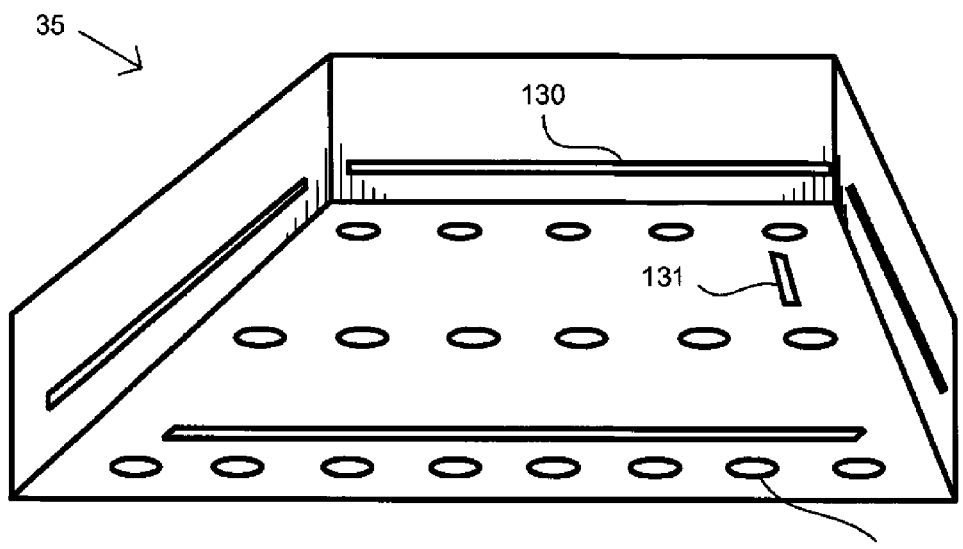
FIGS. 3A and 3B are schematic representations of the bed of the chassis of a robot development kit.

Illustrated in FIG. 3(A) is the bed 35 located within the main body 11 and connected to the chassis 103. FIG. 3A shows a bed configuration where a mounting apparatus 130 is installed along the sides of the bed 35 and mounts 131 are included on the floor of the bed 35. It is advantageous to include the mounting apparatus 130 along the sides of the bed 35 and to include mounts 131 within the floor of the bed 35 because both the mounting apparatus 130 and mounts 131 provide the user with structure that can both support and secure payloads installed within the bed 35. Further advantage is realized when the mounting apparatus 130 provides support for tables 800 mounted on top of the bed 35 (see FIG. 12, for example).

Alternative versions may include a mounting apparatus 130 installed at a plurality of heights along the walls of the bed 35. Additional versions may include beds with a plurality of mounts 131 installed within the floor of the bed 35 and configured so that the mounts 131 face one of either a single or multiple directions. Holes 132 are marked within the floor of the bed 35, preferably in any of a variety of configurations and at various pitches (distance between holes 132). The holes 132 are able to receive fasteners for securing payloads installed within the bed 35. In an alternative configuration of the bed 35, holes 132 would not be included within the bed 35.

Further alternative versions may include one or more additional mounting apparatus 136 installed along the bottom, side and top of the robot's main body 11. The mounting apparatus 136 may include mounts, holes, or some combination of mounts and holes. The mounting apparatus 136 may include mounts that provide support for payloads that extend outward from the robot body 11. Furthermore, the holes may be placed in any of a variety of configurations, and may accept fasteners for securing a payload to the robot's body 11. A mounting apparatus 136 included on the robot body 11 provides the user with the flexibility to alter the shape of the body 11, alter the robot's center of gravity, or attach payloads onto the robot in a position other than those positions within the bed 35, for example.

Figure 3B:
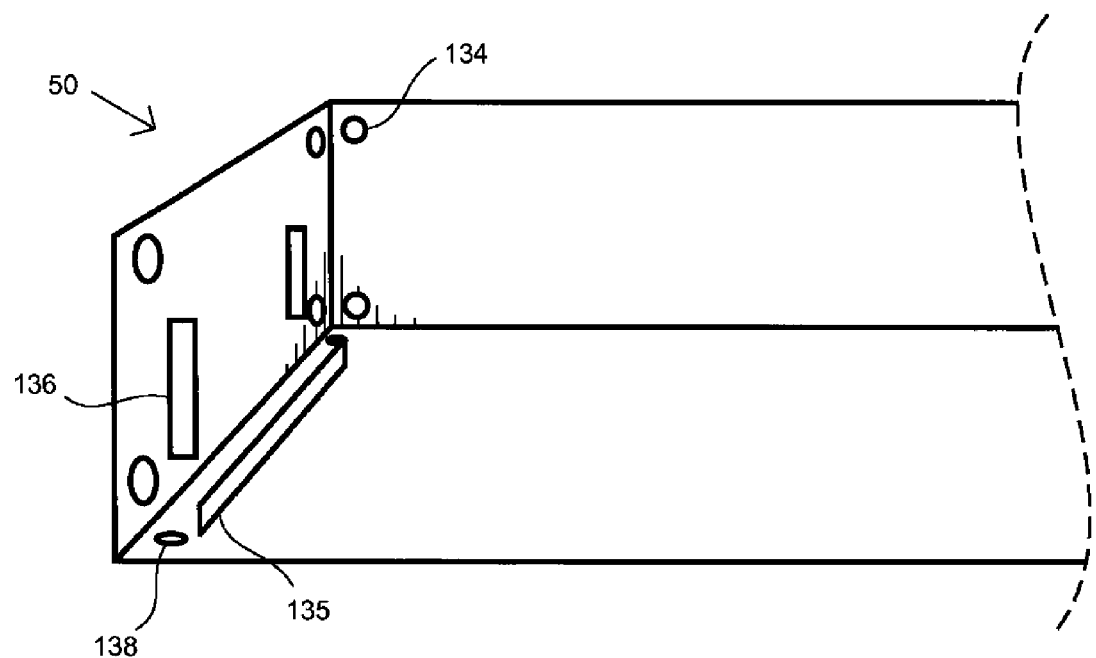

The shelf 50 included within the bed 35 is shown in FIG. 3B. Mounting apparatus 136 are installed along the walls of the bed 35 that are contiguous with the top of the shelf 50 and mounts 135 are included on the top of the shelf 50. Holes 134 are marked on the walls of the bed 35 that are contiguous with the top of the shelf 50. Additional holes 138 are marked on the top of the shelf 50. One advantage of including mounting apparatus 136 and holes 134 along the walls of the bed 35 that are contiguous with the shelf 50, is that a payload or apparatus installed on top of the shelf 50 and within the bed 35 can be secured and supported by the mounting apparatus 136 and by the holes 134.

Further advantage may be realized when the mounts 135 and the holes 138 included on the top of the shelf 50 are used either separately, or in conjunction with the mounting apparatus 136 and the holes 134 installed along the walls of the bed 35, to provide further support and security for a payload or apparatus installed within the bed 35 and on top of the shelf 50. Alternative arrangements may include any combination of holes 134, 138, mounting apparatus 136 and mounts 135 installed within the walls of the bed 35 and the top of the shelf 50.

Figure 4A:
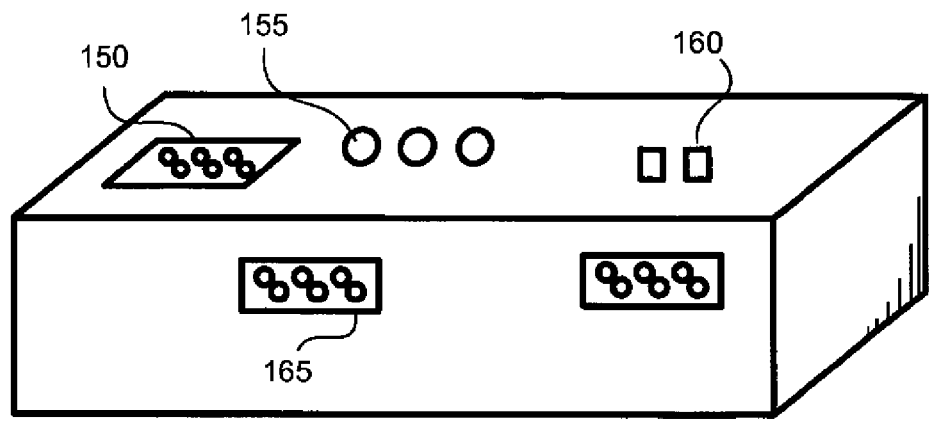
FIGS. 4A and 4B are an example of an external computing component and an illustration of the mating between an external computing component and the communication port located within the bed of the robot development kit, respectively.
Figure 4B:
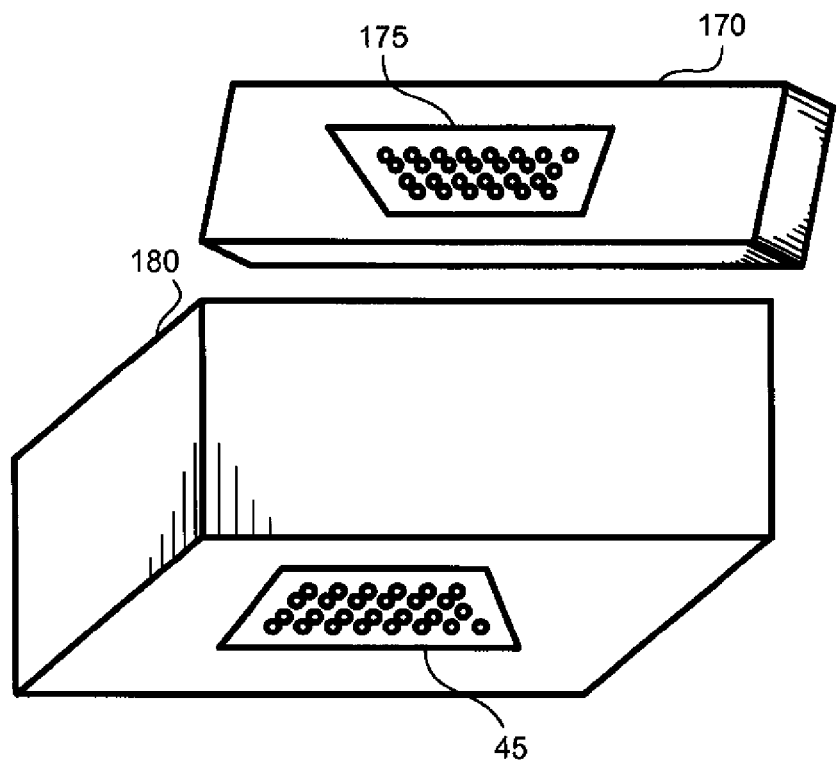

Illustrated in FIG. 4(A) is one example of an external computing device 910 that can be connected to the communication port 45 which is connected to the I/O circuit 300. By establishing a connection with the communication port 45, a connection is made between the external computing device 910 and the I/O circuit 300. Included on the external computing device 910 are I/O connectors 150, 165 with input and output lines connected to the connection interface 175 on the external computing device 910. Further included on the external computing device 910 are LEDs 155 connected to the connection interface 175, and buttons 160 that are also connected to the connection interface 175. As illustrated in FIG. 4(B), the connection interface 175 is positioned at the bottom 170 of the external computing device 910, and includes a 25-pin connector 175 able to mate with the communication port 45 included within the shelf 180.

Upon connecting with the communication port 45 on the shelf 180, a physical and electrical connection is established between the connection interface 175 and the communication port 45. The I/O connectors 150, 165, the LEDs 155 and the buttons 160 are connected both physically and electrically to the connection interface 175 and so establish a connection with the communication port 45 when the connection interface 175 mates with the communication port 45. The connection interface 175 extends outward from the bottom of the external computing device 910 so that the connection interface 175 is similar in form to a plug. The communication port 45 included on the shelf 180 recesses into the surface of the shelf 180 such that the communication port 45 is substantially similar in form to a plug acceptor. When mated, the connection interface 175 fits within the communication port 45 to anchor the external computing device 910 to the shelf 180. Furthermore, when mated, the physical connection between the connection interface 175 and the communication port 45 creates an electrical connection to further create a communication link between the robot 1 and the external computing device 910.

It is advantageous to provide a communication port 45 able to mate with the connection interface 175 on an external computing device 910 because a communicative connection may be established that provides a method of controlling the robot with the controls included on the external computing device 910 and with the software included within the external computing device 910. It is also preferred that the external computing device 910 have the capability to interface with the WinAVR suite of open-source development tools; alternatively, any other suitable programming environment and/or suite of development tools may be used, which have the ability to send instructions to the external computing device 910.

Figure 5A:
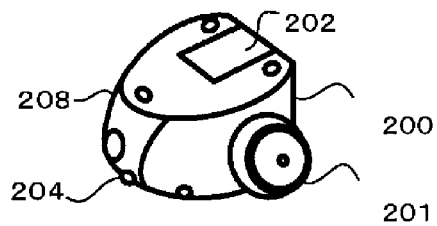
FIGS. 5A through 5L are a collection of alternative configurations of the main body of a robot development kit that has wheels, sensors, and an apparatus to attach a payload.

A preferred configuration of the housing structure 900 includes a circular main body 11 with a curved bumper 10 located toward the front of the structure, a circular chassis 103 on which the main body 11 is installed, and sensors 102, 104, 106 located on the bottom of the main body and positioned along the front perimeter of the main body 11. Illustrated in FIG. 5A is an alternative embodiment of a housing structure 900 that includes a triangular shaped main body 200 with a substantially uniform height, a rounded bumper 208 connected to the front end of the rectangular main body 200, and sensors 204 located on the bottom of the main body 200 and positioned along the perimeter of the main body. Further connected to the main body 200 is a bed 202 located toward the rear of the main body 200 and two wheels 201 connected to the bottom of the main body.

Figure 5B:
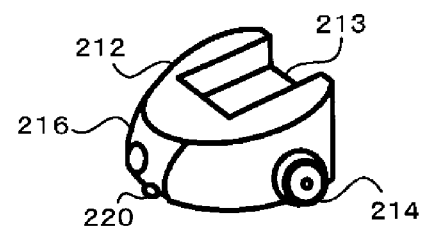
Figure 5C:
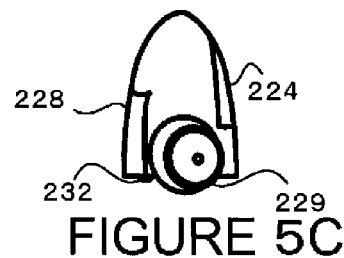

An alternative version of the housing structure is displayed in FIG. 5B and includes an oblong main body 212 with a substantially uniform height, a rounded bumper 216 connected to the front of the main body 212, and sensors located on the bottom of the main body 212 and positioned along the perimeter of the main body 212. A bed 213 is included within the main body 212 and is located at the rear of the main body. Two wheels 214 are located on either side of the main body 212 and are connected to the bottom of the main body. FIG. 5C shows an alternative embodiment that includes a triangular shaped main body 224 with a non-uniform height and a main body 224 in the shape of an upright triangular shell. A bumper 228 is connected to the front of the main body 224 and sensors 232 are located along the perimeter of the main body 224. The main body 224 includes a bed 223 located on the rear of the structure and two wheels 229 connected to the bottom of the main body 224.

Figure 5D:
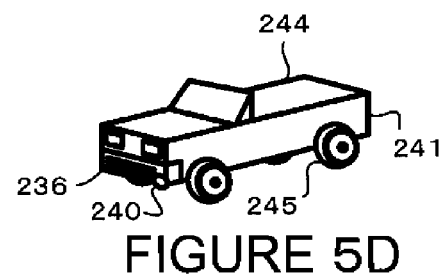

Referring to FIG. 5D, yet another embodiment of the housing structure 900 includes a main body 244 shaped like a truck with varying widths and heights and including a bed 241 located on the rear of the main body 244 and four wheels 245 connected to the bottom of the main body 244. Further included on the main body 244 is a bumper 236 connected to the front of the structure and sensors 240 installed on the bottom of the main body 244 and located along the perimeter of the structure.

Figure 5F:
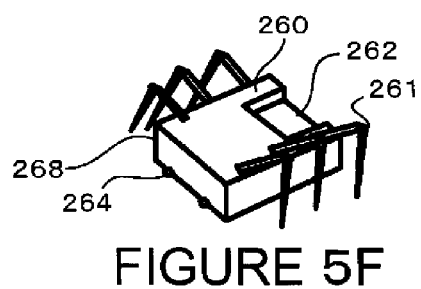
Figure 5E:
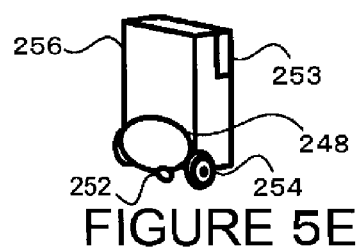

Further referring to FIG. 5E, another embodiment of the housing structure 900 includes an upright, substantially rectangular main body 256 that includes a bed 253 located on the rear of the main body 256 and within the volume of the main body 256. Also included on the main body 256 are two wheels 254 installed on the bottom of the main body, a bumper 248 connected to the front of the main body, and sensors 252 connected to the bottom of the main body and positioned along the perimeter of the main body. The wheels 254 are connected to a drive assembly able to drive the structure using an inverted pendulum movement.

Another embodiment shown in FIG. 5F illustrates a main body 260 that is rectangular in shape with a substantially uniform height and that has legs 261, operative to mobilize the structure, and that are attached to the main body 260. Installed on the main body 260 is a bumper 264 that is attached to the main body and located toward the front of the structure, sensors 264 that are installed on the bottom of the main body 260 and located along the perimeter of the structure, and a bed 262 included within the volume of the main body 260 and located toward the rear of the structure.

Figure 5G:
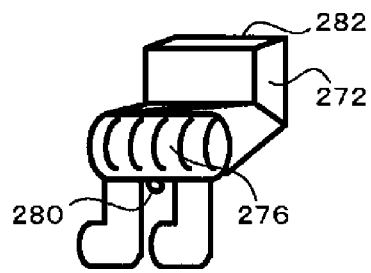

FIG. 5G illustrates another embodiment of the housing structure 900 that includes a main body 272 that stands at a height greater than its width and that is shaped like a man with two legs 280 attached to the bottom of the body and able to mobilize the structure and with a bumper 276 connected to the front of the main body 272. A bed 282 is included within the volume of the main body 272 and located in the rear of the main body 272. In a preferred embodiment the bed 282 is included completely within the volume of the main body 272, but an alternative embodiment may allow the bed 282 to extend beyond the volume of the main body 272. Sensors 280 are installed on the bottom of the main body 272.

Figure 5H:
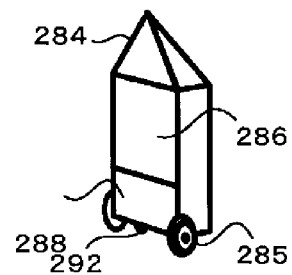
Figure 5I:
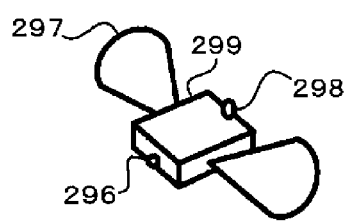

An additional embodiment is displayed in FIG. 5H which includes an upright triangular main body 284 with three wheels 285 connected to the main body 284 at each point of the triangular chassis. Further included within this embodiment is a bumper 288 connected to the main body 284 and located toward the front of the structure, a bed 286 included within the volume of the main body 284 and located toward the rear of the structure, and sensors installed on the bottom of the main body 284 and located along the perimeter of the structure. FIG. 5I is another embodiment of the housing structure that has an elongated main body 299 with a substantially uniform height and including wings 297 attached to either side of the main body 299 and including a propeller 298 attached to the main body 299 and located at the front of the structure. Further included on the main body 299 are sensors installed on the bottom of the main body 299 and located along the perimeter of the structure.

Figure 5J:
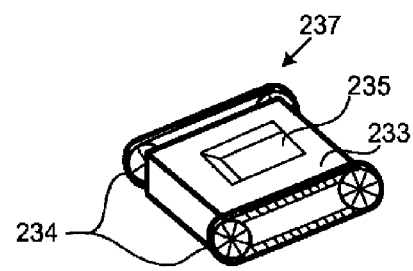
Figure 5K:
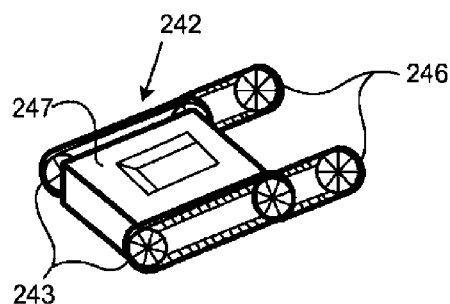

Illustrated in FIG. 5J is another alternative embodiment of the housing structure 900 that includes a main body 233 with a bed 235 within which payloads can be installed. This embodiment 237 includes a single set of articulated tracks 234 installed parallel to each other and on either side of the main body 233. Each track 234 preferably includes a flexible belt coupled to pulleys that are further connected to the main body 233. The pulleys in combination with the flexible belt mobilize the robot 237. Sensors installed along the bottom and top of the main body 233 may be included. Furthermore, in versions of the robot 237 where a bumper is included on the main body 233, the tracks 234 may be installed such that the length of each track 234 does not extend past the corresponding length of the main body 233. FIG. 5K illustrates an alternative version of the robot 237 illustrated in FIG. 5J, where the robot 242 in FIG. 5K includes two sets of articulated tracks. Both a primary set of tracks 243 and a secondary set of tracks 246. Preferably the secondary set of tracks 246 installed on the robot 242 operate like flippers and pivot about a joint to elevate and further alter the robot's center of gravity. Included within this robot 242 is a main body 247 with a bed that can accept payloads. While the embodiment illustrated in FIG. 5K includes two sets of articulated tracks, alternative versions may include a robot with more than two sets of articulated tracks. Further alternative embodiments may include multiple sets of articulated tracks included within the length of the main body 247, or multiple sets of articulated tracks where at least one set of tracks is shaped like a flipper such that it is triangular in shape.

Figure 5L:
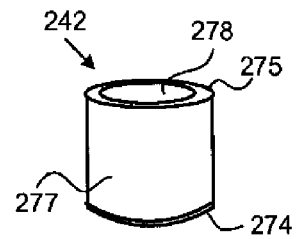

An additional alternative embodiment is illustrated in FIG. 5L. The robot 273 illustrated in this embodiment includes a base 274 that supports a main body 277, and a top platform 275 that further includes a bed 278 able to accept payloads. Furthermore, the robot 273 may remain stationary and supported by the base 274, where movable payloads may be installed within the bed 278 included on the top platform 275. Example payloads may include a movable arm with multiple degrees of freedom about the stationary robot body 277.

Figure 6:
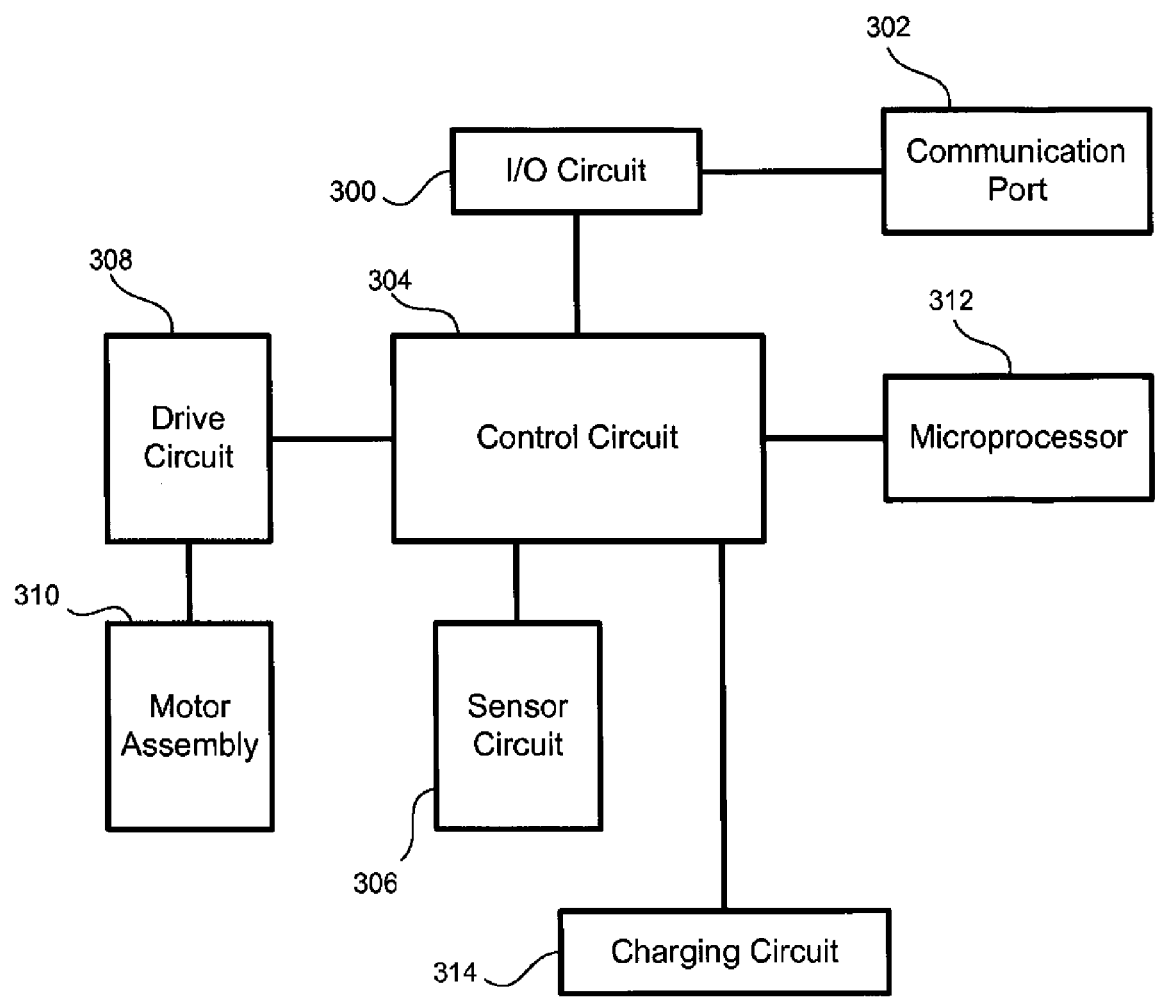
FIG. 6 is a block diagram of the control system for a robot development kit.

FIG. 6 is an illustration of various components of a control system. Included within the control system is a drive circuit 308 connected to a control circuit 304 and to a motor assembly 310 which is further connected to either one or both of the differentially driven wheels 110, 112. The drive circuit 308 mobilizes the motor assembly 310 in response to drive commands outputted by the control circuit 304. Further mobilization occurs when the drive circuit 308 relays the drive commands to the motor assembly 310, which in turn interprets the drive commands in order to rotate and turn a differentially driven wheel 110, 112. An I/O circuit 300 is connected to the control circuit 304 and to a communication port 302 which can further connect to the connection interface 175 on an external computing device 910. The I/O circuit 300 receives data from the communication port 302 and relays the data to the control circuit 304, and alternatively receives data from the control circuit 304 and transmits the data to the communication port 302.

An advantage of having an I/O circuit 300 that bridges the line of communication between the communication port 302 and the control circuit 304 is that data can undergo processing in the I/O circuit 300 before it is transmitted to the control circuit 304, which reduces the amount of processing done within the control circuit 304. In an alternative configuration the communication port 302 can be connected directly to the control circuit 304 and so external computing devices connected to the communication port 302 can communicate directly with the control circuit 304.

Further referring to FIG. 6, a microprocessor 312 is connected to the control circuit and is operable to process data inputted into the control circuit 304 and to regulate commands outputted by the control circuit 304. Furthermore, a sensor circuit 306 is connected to the control circuit 304 and also to various sensors. The sensor circuit 306 receives sensor data from the sensors (such as sensors 102, 104, 106) and relays the data to the control circuit 304 where the data is processed and analyzed.

The control circuit 304 further includes storage memory (not shown) that can store software routines and sensor data. The microprocessor 312 interfaces with the storage memory included in the control circuit 304 to access stored software routines and further execute the routines. Furthermore, the included memory may store sensor data for use in software routines executed by the microprocessor 312.

Connected to the battery and to the plug 31 is a charging circuit 314 which is further connected to the control circuit 304. The control circuit 304 is connected to the drive circuit 308, the I/O circuit 300, the sensor circuit 306, the charging circuit 314, and to the microprocessor 312. The control circuit 304 receives data from the I/O circuit 300, the sensor circuit 306, and the charging circuit 314, and transmits data to the drive circuit 308, the I/O circuit 300, and the charging circuit 314. In accordance with one embodiment, the control circuit 304 may include the microprocessor 312, which processes and converts data received by the control circuit 304 and generates and conditions data to be transmitted by the control circuit 304. Alternatively, the control circuit 304 and microprocessor 312 may be implemented as separate components.

Alternative versions of the control system may include a GPS unit, or radio connected to the central control circuit 304 for localization and communication. Further additional components include a speaker and microphone assembly to generate and disseminate voice information, and a camera for generating video feedback of the robot's environment.

Figure 7:
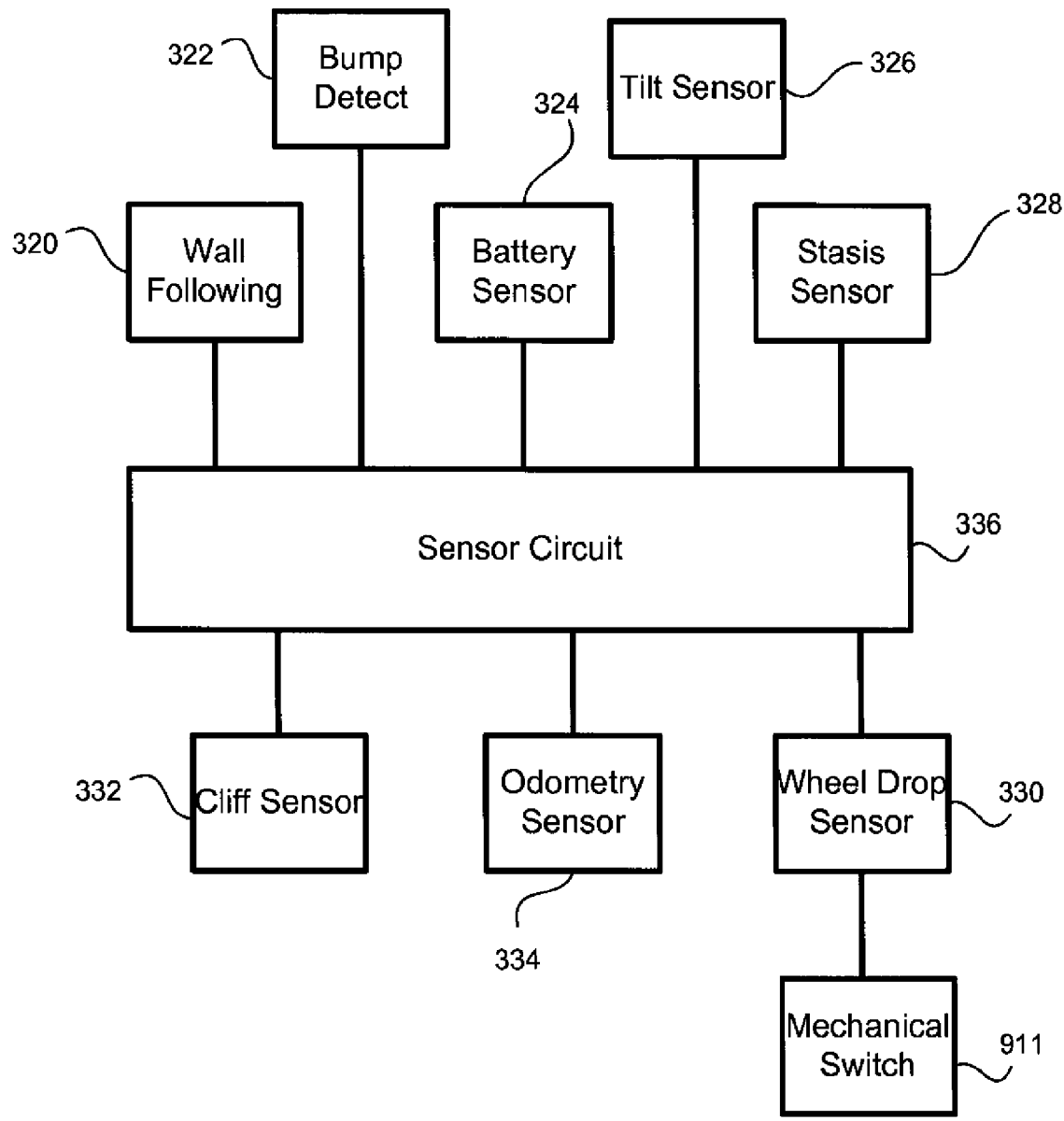
FIG. 7 is a block diagram of an example sensor arrangement connected to a sensor circuit.

Illustrated in FIG. 7 is a preferred embodiment of a sensor circuit 336 and a preferred arrangement of sensors connected to the sensor circuit 336. A wheel drop sensor 330 is connected to the sensor circuit 336, to the caster wheel 100 and to both of the differentially drive wheels 110, 112. The wheel drop sensor 330 monitors a mechanical switch 911 and detects when either the caster wheel 100 or the differentially driven wheels 110, 112, or both actuate the mechanical switch 911. A wheel drop sensor 330 provides an advantageous backup to the cliff detection sensors 332 by detecting when one of the wheels moves over a cliff and actuates the wheel drop sensor 330. Further connected to the differentially driven wheels 110, 112 is an odometry sensor 334 which is also connected to the sensor circuit 336. The odometry sensor 334 senses wheel movement and rotation, and relays the information to the sensor circuit 336. A stasis sensor 328 is connected to the sensor circuit 336 and connected to both differentially driven wheels 110, 112 and to the motor assembly 310.

The stasis sensor 328 monitors both the motor load on the motor assembly 310 and detects when the load placed on the motor exceeds a predetermine threshold. Additionally, the stasis sensor 328 monitors both differentially driven wheels 110, 112 and detects when the load placed on either one or both wheels, exceeds a predetermined threshold. Using data from the motor assembly 310 and the wheels 110, 112 the stasis sensor 328 determines when the robot can no longer move, despite the motor assembly 310 attempting to drive the wheels 110, 112. An advantage of the stasis sensor 328 is the ease in which it may be determined from one sensor when the aggregate data from multiple sensors indicates the robot cannot move, without having to poll the multiple sensors and create a function to determine the cases that indicate the robot cannot move.

Further referring to FIG. 7, a cliff sensor 332 (which may include an optical sensor or a sonic detector, inter alia) is installed on the bottom perimeter of the main body 11, and is connected to the sensor circuit 336. Alternative versions may include cliff sensors 232 installed along the entire bottom perimeter of the main body 11. Further included on the main body is a wall following sensor 320 that is connected to the sensor circuit 336, is installed in the bumper 10 and is located toward the front of the structure and on one of either the preferred right side of the structure or the left side of the structure. The wall following sensor 320 detects the existence of objects that are proximately close to the wall following sensor 320 by projecting a beam outward from the wall following sensor 320, detecting the return beam and then using time of flight calculations to determine whether an object is proximately close to the wall following sensor 320.

Additionally installed within the bumper 10 is a bump detect sensor 322 which is connected to the bumper 10, connected to the sensor circuit 336 and is located on both or either side of the structure. Included within the bump detect sensor 322 is a switch that actuates when the bumper 10 comes into contact with an obstacle. The bump detect sensor 322 detects when the switch actuates and which side of the bumper was actuated, and relays this information to the sensor circuit 336. A battery sensor 324 is connected to the battery and to the sensor circuit 336 and is operable to detect when the battery voltage level has reached a threshold level.

A tilt sensor 326 is installed within the main body 11 of the structure and is connected to the sensor circuit 336. The tilt sensor 326 may use a gyroscope to determine the roll of the structure about the longitudinal axis which the tilt sensor 326 monitors to determine when the roll angle exceeds pre-determined thresholds. Alternative versions can use tilt sensor 326 output to detect and correct changes in the robot's center of gravity. As a further alternative, the tilt sensor 326 may use a liquid-mercury level-type tilt sensor or a spring-based tilt sensor, inter alia. While the above sensors represent a preferred sensor arrangement, alternative arrangements can exist where additional sensors are connected to the sensor circuit 336, to the main body 11, or to a payload that is connected to the main body 11.

While the sensors illustrated in FIG. 7 represent a preferred configuration, alternative configurations may include additional sensors. Sensors that may be included are an accelerometer, a speech recognition sensor, a PSD or other light detecting sensor, and/or an inertial measurement unit (IMU). An accelerometer may be used to sense acceleration of the robot, and may be used in combination with the tilt sensor to track odometry. The speech recognition sensor may be used in combination with a microphone and speaker to create a speech recognition system able to input speech and generate a data output representative of the sensed speech. An inertial measurement unit may be used in lieu of a combination accelerometer and gyroscope, and may output positional data including angular rotation, acceleration, and both vertical and lateral movement.

Figure 8:
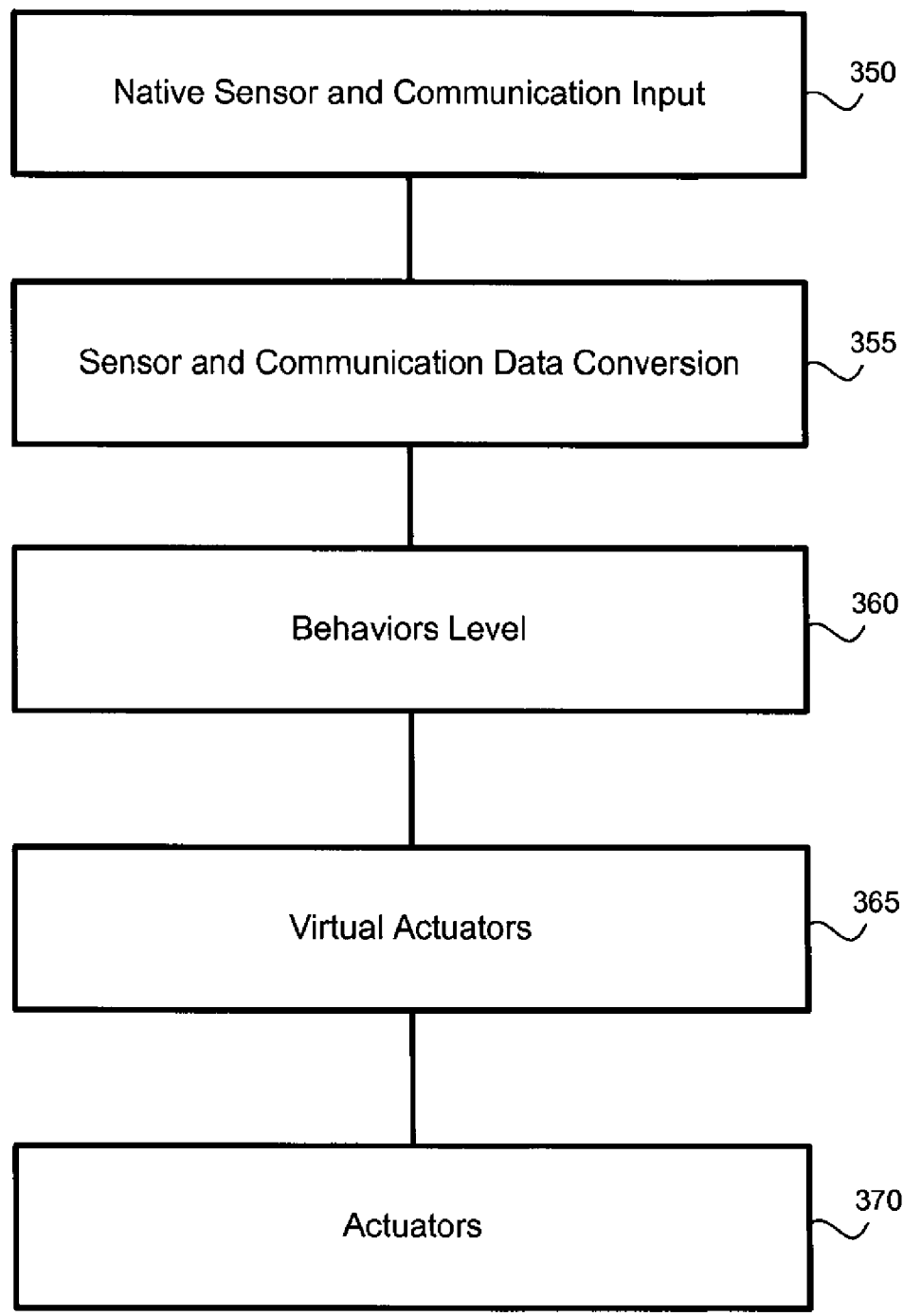
FIG. 8 is a block diagram representation of the levels of software included within a robot development kit.

A preferred software level arrangement is displayed in FIG. 8. The top most layer 350 of software includes software able to collect native sensor and communication input data. Sensor input data preferably includes data generated by external and internal sensors connected to the sensor circuit 306, and may in alternative embodiments include: virtual sensor data generated by software routines included in the control circuit 304 and representative of an aggregation of sensor data from multiple sensors included in the sensor circuit 306, virtual sensor data generated by behavior sub-routines included in the behaviors 385, and simulated sensor output data generated by software routines stored in the control circuit 304 and executed by the microprocessor 312. Communication input includes data received by the communication port 302 from a connection interface 175 included on an external computing device 910. The native sensor and communication input level of software 350 inputs sensor data in its native form and passes this data through to the sensor and communication data conversion routine 355 where the data is converted into a format which the behavior software level 360 can use within individual behaviors 385. The sensor and communication data conversion routine 355 provides a sensor virtualization level by filtering sensor data while the sensor data is in a native format, using internal functions to convert native sensor data into logical values and thus converting native sensor data into virtual sensor data.

The sensor and communication data conversion routine 355 converts communication data by analyzing the communication data byte header, determining which serial input handler 380 corresponds to the communication data packet, and then sending the communication data packet to a particular serial input handler 380 where the communication data packet is filtered, and passed through to the behaviors 360. There is an advantage to including a sensor and communication virtualization routine 350 because otherwise, a user would be required to write their own routine to convert the native sensor and communication data from the native format into a logical format able to be interpreted by the behavior software level 360.

Figure 9:
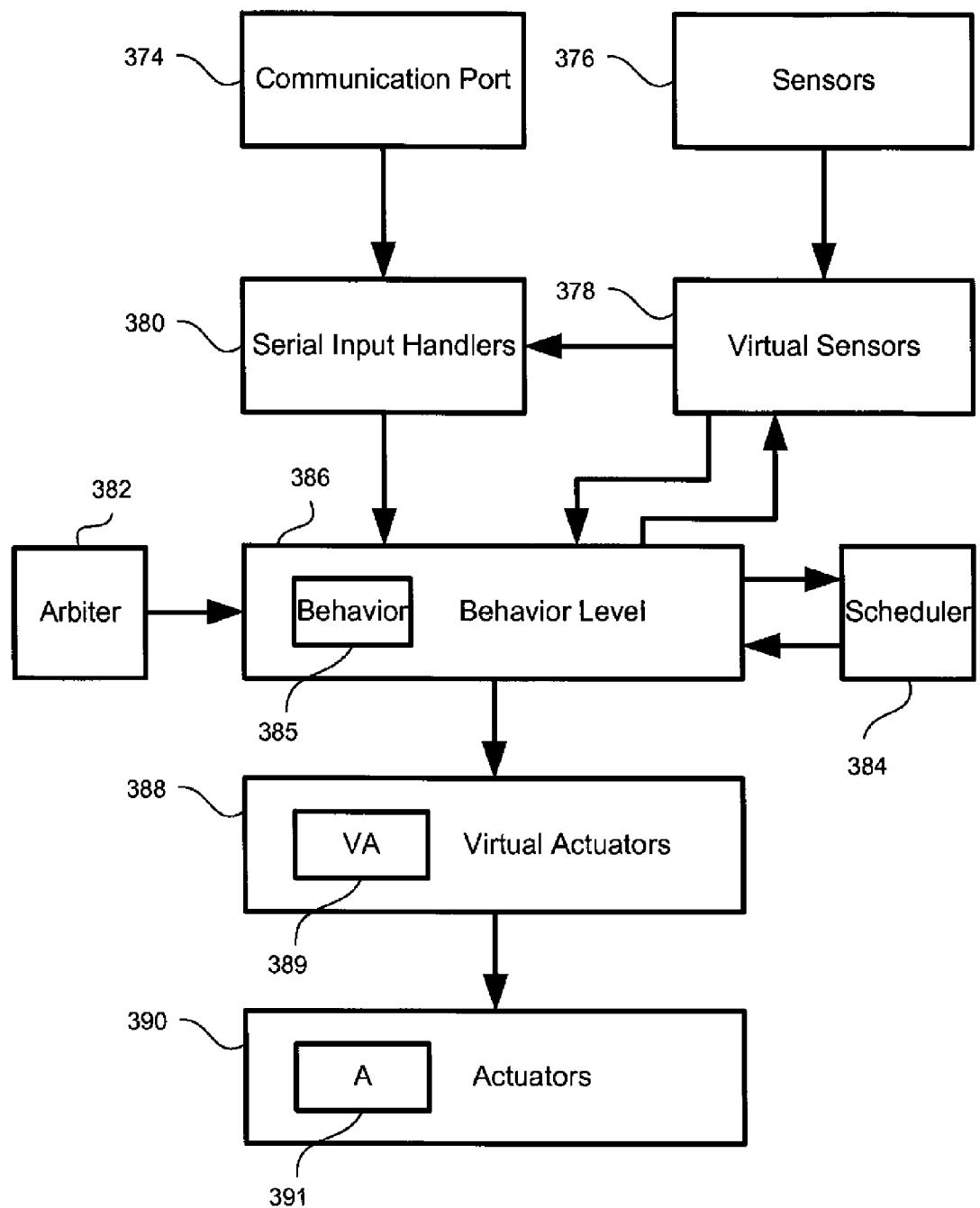
FIG. 9 is a flow chart of the movement of data between each software level included within a robot development kit.

Further referring to FIGS. 8 and 9, the behavior software level 360 is connected to the sensor and communication data conversion routine 350, and to virtual actuators 365. Included within the behavior software level 360 is an arbiter 382, and a scheduler 384, both of which are connected to the behavior software level 360 and are operable to control the individual behaviors 385 included within the behavior software level. The behavior software level 360 inputs converted sensor output from the sensor and communication data conversion routine 350 and uses the sensor output, and scheduler 384 output as well as the priority assigned to each individual behavior 385 to determine which behavior 385 should operate. Individual behaviors 385 are chosen by the arbiter 382 and control either one or multiple virtual actuators 365.

Advantages of the behavior software level 360 include providing pre-programmed behaviors able to operate autonomously using the arbiter 382 to cycle through the behaviors, the scheduler to determine and record the duration of each behavior 385, and output from the sensor and communication data conversion routine 355 to determine whether a behavior's start command has been satisfied. Alternative versions may not include the behavior software level 360 and may alternatively allow the user to control the virtual actuators 365 directly through the communication port 302.

Virtual actuators 365 are connected to the behavior software level 360 and to the actuator software level 370. The virtual actuator software level 365 inputs commands sent by behaviors 385, and virtualizes the command by converting the command into a format native to the corresponding actuator 391. As an example, a drive command may be sent by the behavior software level 360 to the virtual actuators 365 where a virtual actuator 389 corresponding to the bearing and speed navigation command, is called by the virtual actuator software 365 where the drive commands are virtualized by a drive virtual actuator 389 corresponding to the drive commands.

The drive virtual actuator 389 converts the drive command into a command format native to a drive actuator 391, which is an actuator within the actuator software level 370 that is connected to the drive circuit 308. The actuator software level 370 is connected to the virtual actuator software level 365 and to actuators (such as the drive actuator 391) connected to the control circuit 304. Alternative versions of the software may include a combined level of software that virtualizes commands sent by the behaviors 360 by converting the commands into a native format, and which relay the commands directly to the actuators 391.

FIG. 9 is a diagram of a preferred software architecture included within a robot development kit. The native sensor and communication input software level 350 includes within it both command interface port software 374 connected to serial input handlers 380 and to the communication port 45, and sensor software 376 connected to virtual sensors 378 and to the sensor circuit 306. The command interface port software 374 inputs command data from the communication port 45 using a command input routine (see FIG. 10, for example), and uses header arguments included within each command data byte to determine an appropriate serial input handler 380 to call. The serial input handlers 380 are connected to the command interface port 374 and to the behavior level of software 360 where the serial input handlers 380 are connected to individual behaviors 385 included within the behavior level of software 360.

When a serial input handler 380 is called, the serial input handler 380 converts the command data sent by the command interface port software 374 from a native format into a format able to be recognized by an individual behavior 385. After converting the command data, the serial input handler 380 then passes the command to a behavior 385 within the behavior software level 386. Further connected to the serial input handlers 380 are the virtual sensors 378 connected to the sensors 376.

Virtual sensors 378 are connected to the behavior level of software 386, and to the serial input handlers 380. A virtual sensor 378 imports sensor data 376 in a native sensor format and then converts the data into a format able to be recognized by individual behaviors 385, using pre-programmed formulas and constants. Once the sensor data 376 is converted, the virtual sensors 378 relay the data to the serial input handlers 380 and to the behavior software level 386.

Advantages of including a combination of serial input handlers 380 and the command interface port 374 include providing the user with the ability to program the robot to respond to a created set of commands while maintaining the integrity of software preloaded onto the microprocessor 312 by preventing the user from altering such software. The virtual sensors 378 provide the user with the advantage of being able to pole one or a number of sensors 376 at a time, irrespective of the underlying hardware or implementation details of the actual sensor associated with the virtual sensor. Further advantages include allowing the user to easily view and import logic level representations of sensor readings through the virtual sensors 378 without having to write a routine that tracks the native sensor output and then converts the native sensor data into logic levels able to be processed by behaviors 386. Alternative versions of the software may include a software level that combines the communication port software 374 and the serial input handlers 380. Further alternate versions of the software may include a software level that combines the sensor 376 and the virtual sensors 378.

Further referring to FIG. 9, the behavior software level 386 is connected to and able to communicate with the virtual sensors 378, a scheduler 384, virtual actuators 388, and behaviors 385 included within the behavior level of software 386. The behavior software level 386 is a behavior based system of software with a reactive architecture that is connected to the virtual sensors 378 which provide the system with environmental input. An arbiter 382 is connected to the behavior level of software 386 and is operable to control which behavior 385 within the behavior level of software 386 is active. A scheduler 384 is connected to the behavior level of software 386 and schedules the behaviors 385 based on duration, priority and the duration that the current behavior 385 has run.

Together the behaviors 385 are finite state machines that comprise a reactive software architecture implementing a behavior based system which elicit behaviors 385 from the system by allowing the system to operate using a combination of virtual sensor 378 output, scheduler 384 input, behavior 385 priorities and the arbiter's 382 selection as to which behavior should have control of the actuators 390. Alternative ways of implementing the robot include a cooperative multi-tasking software system which uses an arbiter 382 to select behaviors 385 based on a behavior's priority and based on virtual sensor input 378. Yet another alternative includes running each individual behavior 385 and the arbiter 382 on a multithreaded processor that allows each behavior 385 to continually and/or concurrently execute while allowing the arbiter 382 to decide which behavior gains control of the actuators.

A deliberative software architecture can also be implemented by allowing behaviors to respond to sensor 376 output by drafting and implementing a plan based on what the robot sensed. A hybrid architecture may also be implemented through the allowance of emergent behaviors 385 and the use of a deliberative software architecture that monitors certain sensor 376 output to create and execute a plan which is implemented based on condition states corresponding to various scenarios.

Referring to FIG. 9, virtual actuators 388 are connected to the behavior level of software 386 and to a set of actuators 390. The virtual actuators 388 input commands sent by behaviors 385, virtualize them into a command set in a format that is native to the corresponding actuator 391 and then relays the native command set to the actuators 390. A particular example includes a set of drive functions sent by a behavior 385 to the virtual sensors 388 where the bearing and speed navigation commands are converted from their virtual format into a native format able to be interpreted by the drive circuit 308 and the motor assembly 310.

A particular advantage of the virtual actuators 388 is that they prevent the user from having to create a routine that takes logic level commands outputted by the behaviors 386 and converts the commands into a command set able to be interpreted by the motor assembly 310. Such features are further advantageous in that they enable users who are not familiar with native motor controls to nonetheless easily program the robot. The actuators 390 represent a level of software preferably connected directly to individual actuators 391 which are in turn connected to the drive circuit 308, the charging circuit 314, the control circuit 304, the I/O circuit 300, and the sensor circuit 306. Alternative versions may include a layer of software that combines the virtual actuators 388 with the actuators 390.

Figure 19:
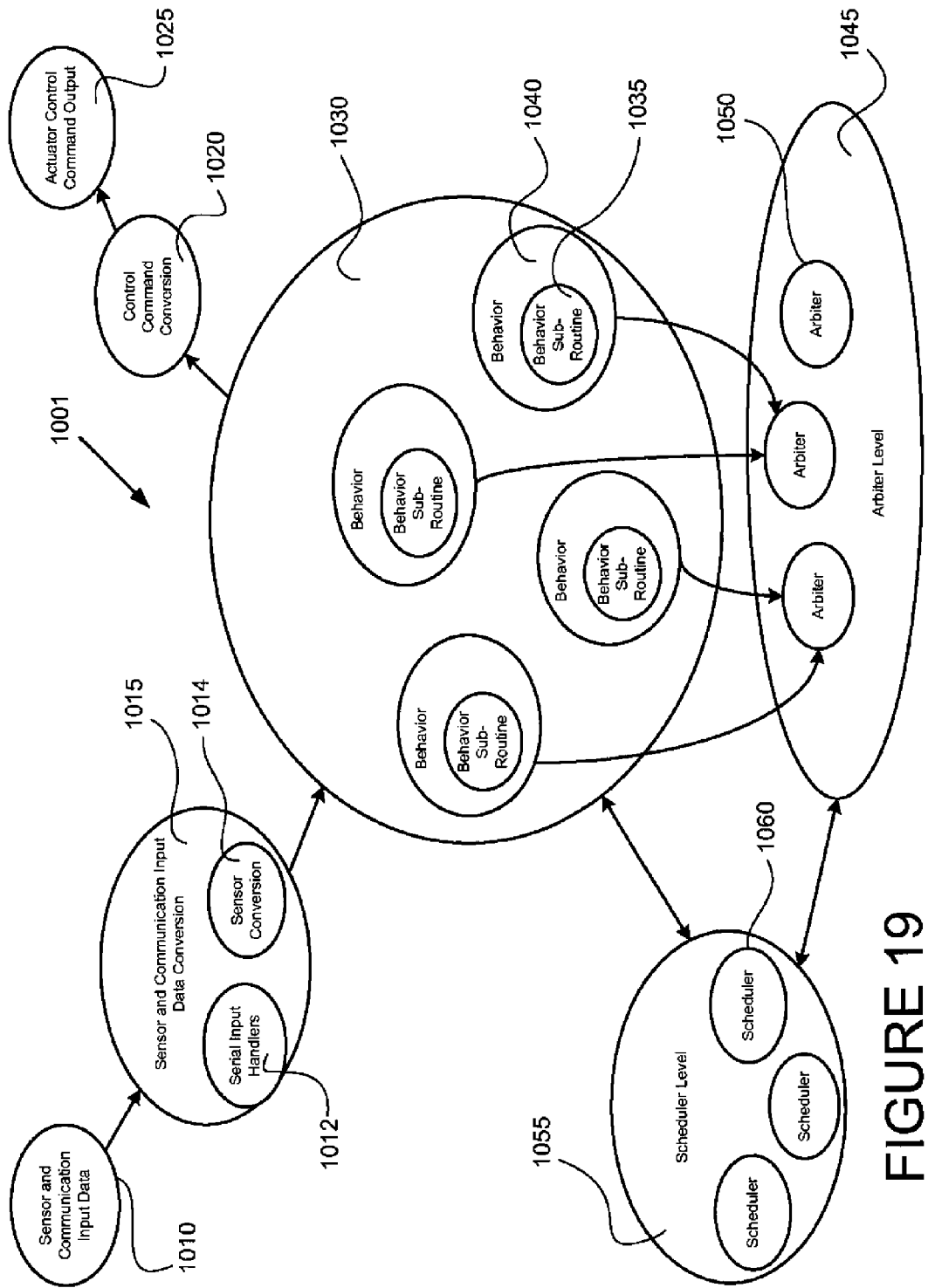
FIG. 19 illustrates an alternative embodiment of a software architecture for robot control.

Illustrated in FIG. 19 is an alternative embodiment of the software architecture. The serial and communication input data level 1010 includes a number of software routines dedicated to interfacing with sensor and communication circuitry to input raw sensor and communication in a format native to a particular sensor or a particular communication protocol and converting such data into a logic level format. Examples of sensor input software routines in the serial and communication input data level 1010 include a routine dedicated to interfacing with input from each bumper sensor 322 and configured to take raw voltage values inputted from signal processing circuits included in the sensor circuit 336, and convert such values into logical representations. While the sensor and communication input routines are preferably implemented as software routines, they can alternatively be implemented by circuits able to generate logical representations of the sensor and communication input data that are recognized by software routines included in the sensor and communication conversion level 1015. Further alternative embodiments of a system that provides a serial and communication input data level 1010 with routines and circuitry associated with a particular sensor or communication input device is described in U.S. utility patent application Ser. No. 10/717,830, entitled "DEVICES AS SERVICES IN A DECENTRALIZED OPERATING SYSTEM," filed on Nov. 20, 2003, the contents of which are incorporated by reference herein.

The sensor and communication conversion level 1015 includes software conversion routines that interface with the sensor and communication input routines included in the data input level 1010 to further process the sensor and communication data. The communication data is processed in the conversion level 1015 by the serial input handlers 1012 that parse communication data streams reviewing the serial headers and data content to determine the serial command sent and further route the associated data content accordingly. Sensor conversion routines 1014 are included to input logical representations of sensor input data and further convert the data into a format recognized by behavior subroutines. An example of a sensor conversion routine 1014 includes a routine for aggregating bumper sensor input from the bump sensors 322 to further generate a data output representative of which bump sensor 322 was actuated.

At the center of the alternative software architecture is a behavior software level 1030 that includes individual behaviors 1040 dedicated to performing specific tasks such as turning the robot and driving the robot in a forward direction. The behavior level interacts with the sensor and communication conversion level 1015 via software sub-routines included within each behavior 1040 and which interacts with corresponding sensor conversion routines 1014 and serial input handlers 1012 to poll and retrieve sensor and communication data. Further included in each behavior 1040 are multiple behavioral sub-routines 1035 for implementing a behavior's 1040 specified task. An example of a behavior sub-routine 1035 includes a sub-routine for polling the bumper sensors 322 to identify when a bumper sensor 322 is actuated and to further call another sub-routine included in the behavior 1030 that generates turn commands in response to the sensed actuation of the bumper sensor 322.

Activation of a behavior 1040 is controlled by an arbiter 1045 included in the arbiter level 1050. The arbiter 1045 determines which behavior 1040 should be active at a given point in time based on a review of the behavior's priority, and based on output from a scheduler 1060 included in the scheduler level 1055. The behavior level 1030 interfaces with the arbiter level 1050 via associations between a behavior 1040 and an arbiter 1045, where an arbiter 1045 can be associated with any number of behaviors 1040 and a behavior 1040 is typically associated with only one arbiter 1045. It is particularly advantageous to implement behaviors 1040 using multiple arbiters 1045 as each arbiter 1045 is configured to operate simultaneously and asynchronously with respect to other arbiters 1045, and further implement behaviors 1040 associated with that particular arbiter 1045 simultaneously and asynchronously with respect to other behaviors 1040 not associated with that particular arbiter 1045 but rather with a different arbiter 1045. The ability to execute a behavior 1040 at the same time as another behavior, and either synchronously or asynchronously with respect to the other behavior; results in a software system able to respond instantaneously and asynchronously to sensor and communication input data. An alternative to the preferred embodiment, supra, is a software architecture that includes behaviors 1040 that may be associated with multiple arbiters 1045.

Each arbiter 1045 interfaces with one or many schedulers 1060 included in the scheduler level 1055. Each scheduler 1060 is associated with a behavior 1040 such that the scheduler 1060 tracks information regarding the behavior's run-time. Such information may include the length of time that a behavior has executed in a given period, the number of times a behavior has executed in a given period, the amount of time that has lapsed since the behavior was last executed, or any other data value characteristic of the behavior's execution. The schedulers 1060 transmit a behavior's run-time data to the behavior's arbiter 1045 where the arbiter 1045 reviews the run-time data in combination with the behavior's priority to determine whether the behavior should be executed at that particular point in time. Alternative versions may a single scheduler, or may include schedulers 1060 configured to interface with multiple behaviors 1040.

The behavior level 1030 further interfaces with a control command conversion level 1020 of software that includes software routines that accept individual behavior 1040 output and further convert such output into a software data format native to a corresponding actuator. Typically a behavior's execution results in the generation of output control commands that control the operation of actuators included on the robot. These control commands are outputted from the behavior 1040 in a format native to that particular behavior. The routines included in the control command conversion level 1020 convert the control commands into a data format native to the actuators. The actuator command output level 1025 interfaces directly with the actuators to generate machine level control commands that operate the actuators. Preferably, the actuator command output level 1025 includes software routines, but alternatively may include a level of circuits or programmable logic dedicated to generating machine level control commands that operate the actuators.

Further alternatives to the software architecture illustrated in FIG. 19 include an architecture where a scheduler level 1055 is not included and where the arbiters 1045 within the arbiter level 1050 execute behaviors 1040 based on priority and other characteristics of the behavior 1040. Another alternative version of a software architecture that handles asynchronous data inputs and software routine executions is described in U.S. utility patent application Ser. No. 11/184, 285, entitled "COMMON CONCURRENCY RUNTIME" and filed on Jul. 19, 2005, the contents of which are incorporated by reference herein.

Figure 10:
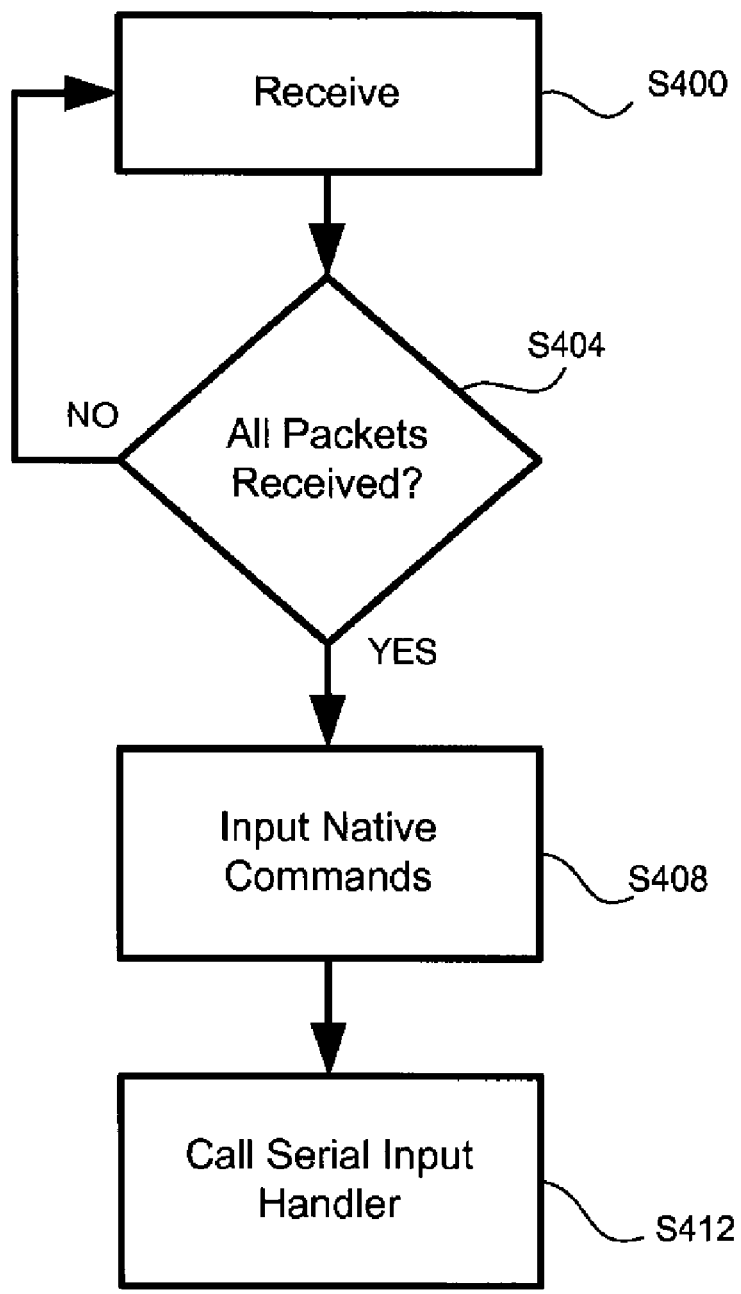
FIG. 10 is a flow chart of a command interpreter routine used by a robot development kit to receive and process data packets sent through a communication port and sent by an external computing device.

Communication between the communication port 302 and the connection interface 175 on an external computing device is preferably achieved through a command interpreter routine such as illustrated in FIG. 10. The command interpreter routine begins at S400 by receiving data packets from an external computing device 910 and through the connection interface 175 on the external computing device 910. Once a packet is received at S400, the command interpreter routine then checks the header of the packet to determine if all the data packets were received at S404. In the event that all the packets were received at S404, the command interpreter routine then inputs all native commands included within the data packets at S408. Once all the native commands are inputted at S408, the command interpreter routine then calls serial input handlers that correspond to each command at S412.

Alternatively, if all packets were not received at S404, the command interpreter routine continues to receive data packets from the external computing device 910 at S400. An advantage of the command input function is that it allows the user to easily communicate with the robot without having to create routines that interpret user commands and then relays the commands to serial input handlers 380.

Figure 20:
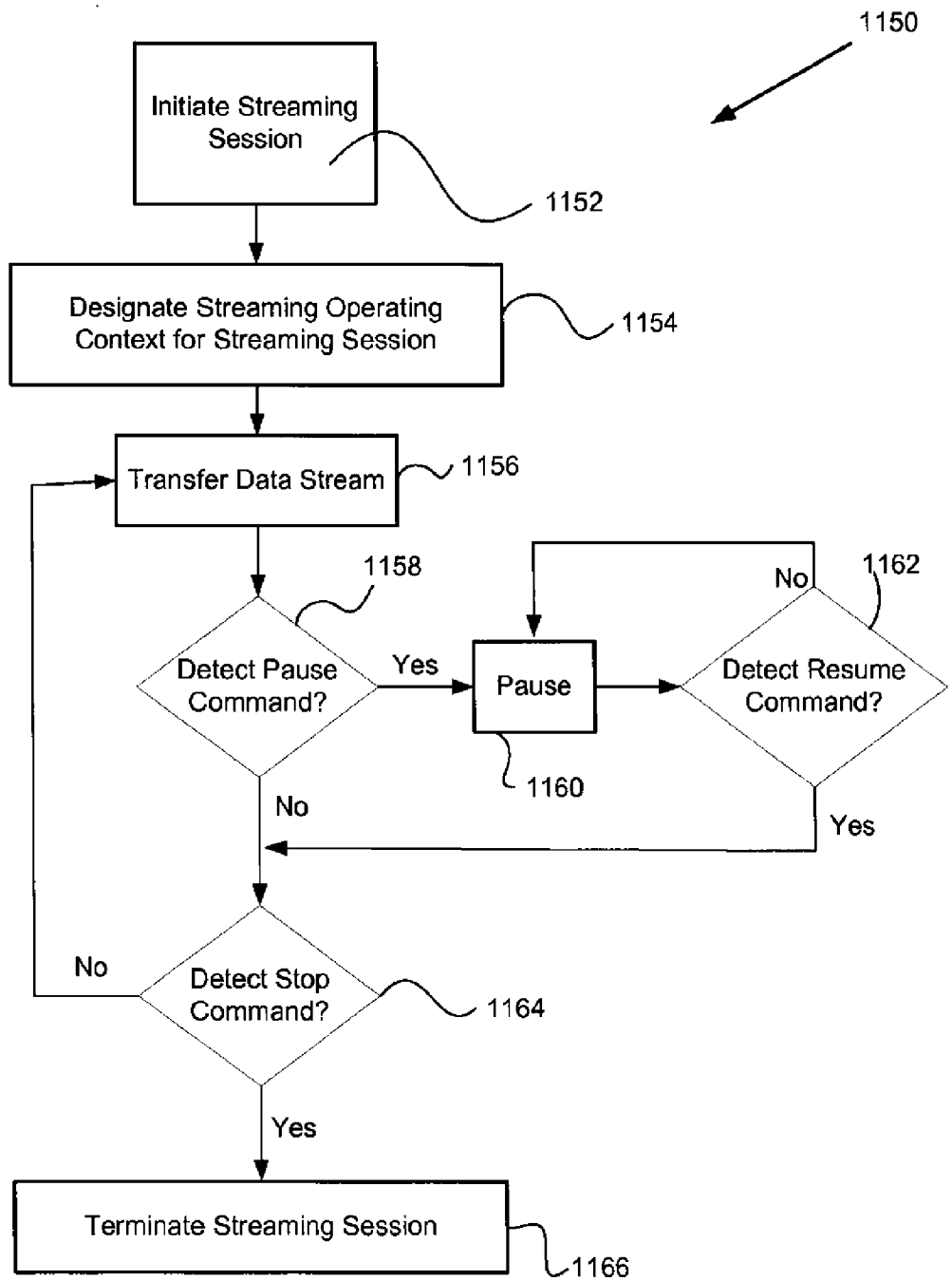
FIG. 20 illustrates an alternative transfer method for handling continuous streams of serial data.

Illustrated in FIG. 20 is an alternative transfer method included in the robot 1 as the preferred protocol for handling continuous streams of serial data. This protocol is further characterized by a streaming routine 1150 that is included in a user control behavior, where such a behavior is configured to interpret and respond to user serial data processed by the serial input handlers 380 and transferred to the behavior level of software 386 to be processed by the user control behavior. The streaming routine 1150 is initiated by sending an initialization packet where the serial input header associated with the packet designates that the packet includes the parameters necessary to open a streaming transfer session. Parameters outlined in the initialization packet include a serial input header that when processed by the serial input handlers 380, commands the robot 1 to initialize a streaming transfer session 1152. Further parameters included are the number of packets that should be sent during the transfer session, the unique packet identification numbers for the packets that should be sent during the transfer session. Together the parameters designate a context 1154 within which the robot 1 should send serial data to the user via the input/output ports 150 on the external computing device 910. Thus, sending the initialization packet with the streaming serial input header initializes the streaming session 1152, while the packet information included within the initialization packet designates an operating context 1154 within which the user control behavior should send serial data to the user.

Once an operating context is designated 1154, a streaming session is opened and configured to begin transferring serial data 1156 according to the operating context outlined within the initialization packet. For example, if the initialization packet outlines an operating context where three packets of data should be sent and where the packet identification numbers should include 12, 23, 34 respectively, then the streaming routine 1150 would transfer streams of serial data 1156 according to those parameters. The stream of data would have the following sequence of data: a serial header command, followed by the serial data, followed by a checksum. This sequence repeats until a pause serial command or a stop serial command is processed by the streaming routine 1150. The serial header command included in the sequence is a serial command that notifies the user that the data to follow is a stream of data sent according to the streaming routine 1150. The serial data stream has the following form: the number of packets included in the stream, and the packet data where each data packet is preceded by the packet data's identification number. Each stream ends with a checksum that indicates the end of a segment of the data stream. Multiple segments are included in the data stream and are of a form substantially similar to the above sequence. These segments will continue to transfer according to specified operating context throughout the duration of the transfer session.

When a pause serial command 1158 is processed by the streaming routine 1150, the streaming routine 1150 pauses 1160 and no new data stream segments are transferred. The routine 1150 continues to pause 1160 until a resume transfer serial command is processed 1162 by the streaming routine 1150. Once the streaming routine 1150 resumes operation, the routine then checks for a stop serial command 1164. Alternatively, if a pause serial command 1158 is not encountered, then the streaming routine 1150 will continue to step 1164 to check for a stop serial command 1164. If no stop serial command is processed, then the routine continues to transfer the data stream 1156 to the user.

When a stop serial command is processed 1164, the streaming routine 1150 terminates the data stream transfer process. Cessation of data streaming ends the streaming session 1166 and no new data transfers according to the session's operating context. The operating context of the streaming session is not saved, and so re-starting a data streaming session requires the user to initialize a new streaming session 1152. While the above is a preferred method for transferring streams of data, alternative methods may be implemented including those outlined in U.S. utility patent application Ser. No. 10/717,741, entitled "SEND BY REFERENCE IN A CUSTOMIZABLE TAG-BASED PROTOCOL" and filed on Nov. 20, 2003, the contents of which are incorporated by reference herein.

Figure 11A:
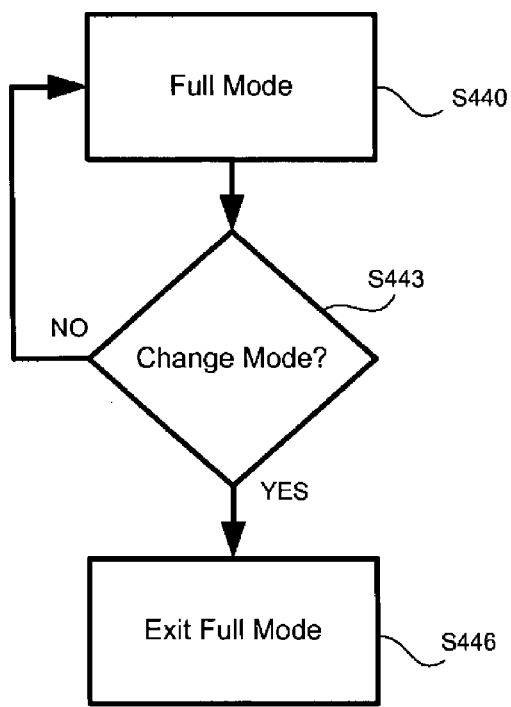
FIGS. 11A through 11C are flow charts that demonstrate various modes included within a robot development kit.
Figure 11B:
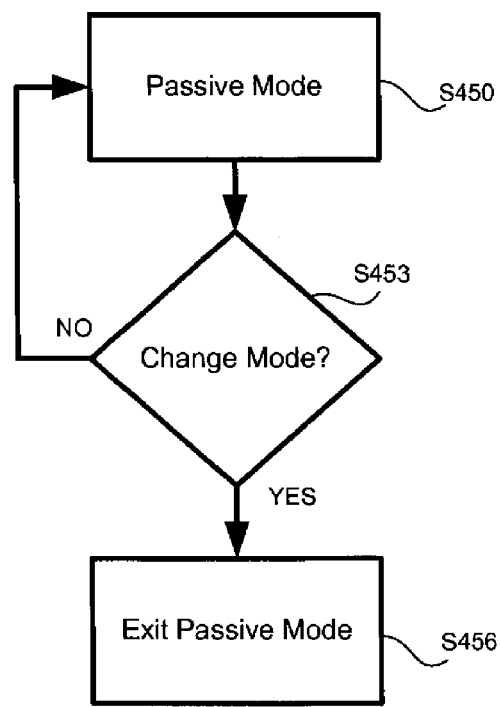
Figure 11C:
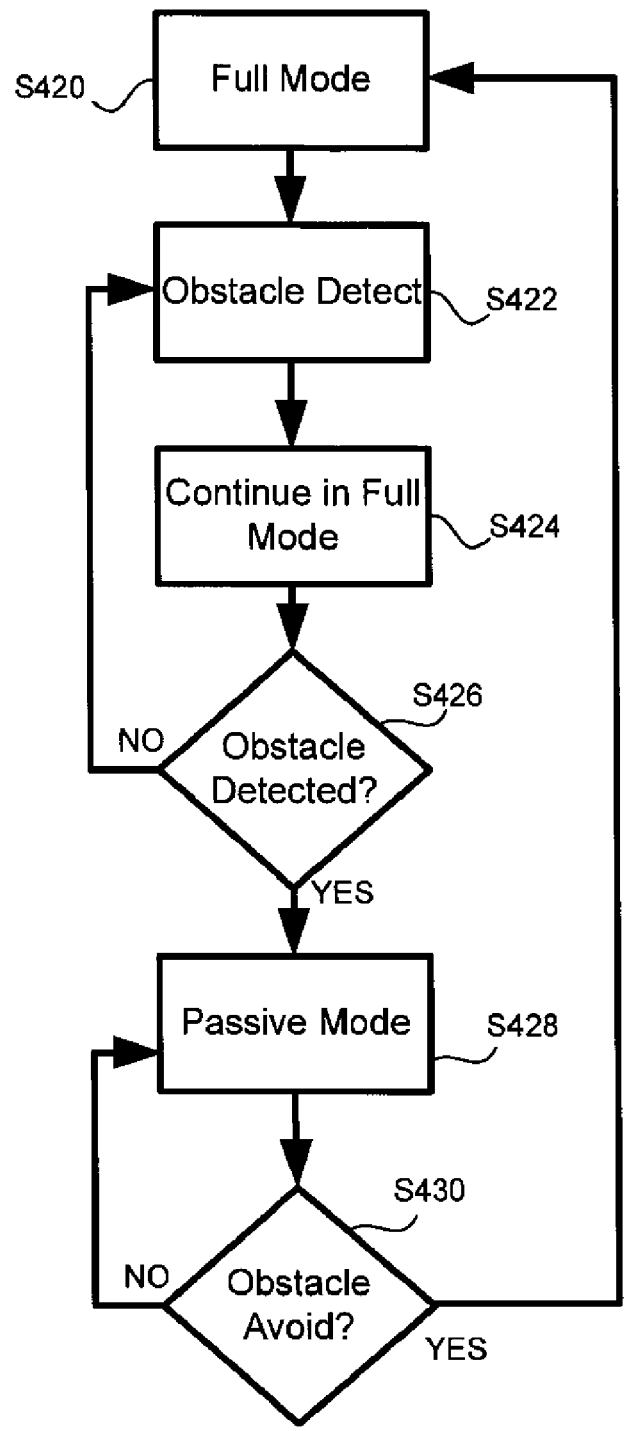

In a preferred embodiment, the robot development platform 1 can operate variously in one of at least the three modes illustrated in FIG. 11: a full mode (see FIG. 11A), a passive mode (see FIG. 11B), and/or a safe mode (see FIG. 11C). Once full mode activates at S440, the structure checks whether a serial command was sent to change the mode at S443. When the structure operates in full mode, the structure is controlled and operated using serial commands only. If full mode detects a command to change the mode at S443, then full mode exits at S446, whereupon the newly activated mode takes over control of the structure. The full mode is advantageous in that it allows the user to have full control over the actuators installed on the robot 1, and operation of those actuators. Safety and escape behaviors that initiate during the passive mode and the safe mode do not run autonomously in response to sensor input as they do in both the passive and safe mode. Thus the user has the ability to program user-specific safety and escape behaviors which further provides the user with a robust educational experience.

When passive mode activates (see FIG. 11B), passive mode allows the structure to operate passively at S450 and then checks whether a serial command was sent to change the mode at S453. When the structure operates in passive mode, the structure is controlled and operated using the pre-programmed behaviors only. If passive mode detects a command to change the mode at S453, then passive mode exits at S456, whereupon the newly activated mode takes over control of the structure. Furthermore, when in passive mode, safety and escape behaviors included in the behavior level of the software 386 are operable to execute autonomously in response to sensor data, and independent of user actions.

Further referring to FIG. 11C, the safe mode includes both a call to the full mode (see FIG. 11A) and a call to the passive mode (see FIG. 11B). When safe mode is activated, it allows the user to operate in full mode at S420; and while in full mode at S420, safe mode performs obstacle detection at S422 and then continues to operate in full mode at S424. If an obstacle is not detected at S426, then safe mode continues to perform obstacle detection at S422 and then operate in full mode at S424. Alternatively, if an obstacle is detected at S426, then the structure moves into passive mode at S428. While in passive mode S428, safe mode checks whether the obstacle is avoided at S430; if the obstacle is not avoided and still being detected, then passive mode continues to be active at S428.

On the other hand, if the obstacle is avoided at S430 then safe mode goes back to S420 and allows the structure to operate in full mode at S420 while performing obstacle detection at S422. Due to the configuration of the safe mode, at any point of time during which the safe mode 11C is operational, there may exist multiple modes running in parallel (and/or concurrently) with one another—for example, as multiple threads of execution run in time-slice fashion on a preempting microprocessor. Alternative embodiments may include a safe mode that does not run in parallel with the full mode and the passive mode but rather includes a routine that achieves obstacle detection absent the intervention of the passive mode.

An advantage of allowing the robot to operate in a passive mode is that such a mode provides a method of observing the robot's actions when the robot is operative to respond to a behavior based system. Further educational advantage is realized in that the passive mode may be used as a model for mimicking the structure of a behavior-based system. Another advantage of the safe mode is that it allows a user to have full control over the robot by implementing user-created routines while still guarding against unforeseen movements that, if the robot were not in safe mode, would result in the robot driving off of a cliff, colliding with an obstacle, or encountering other difficulties.

Figure 21:
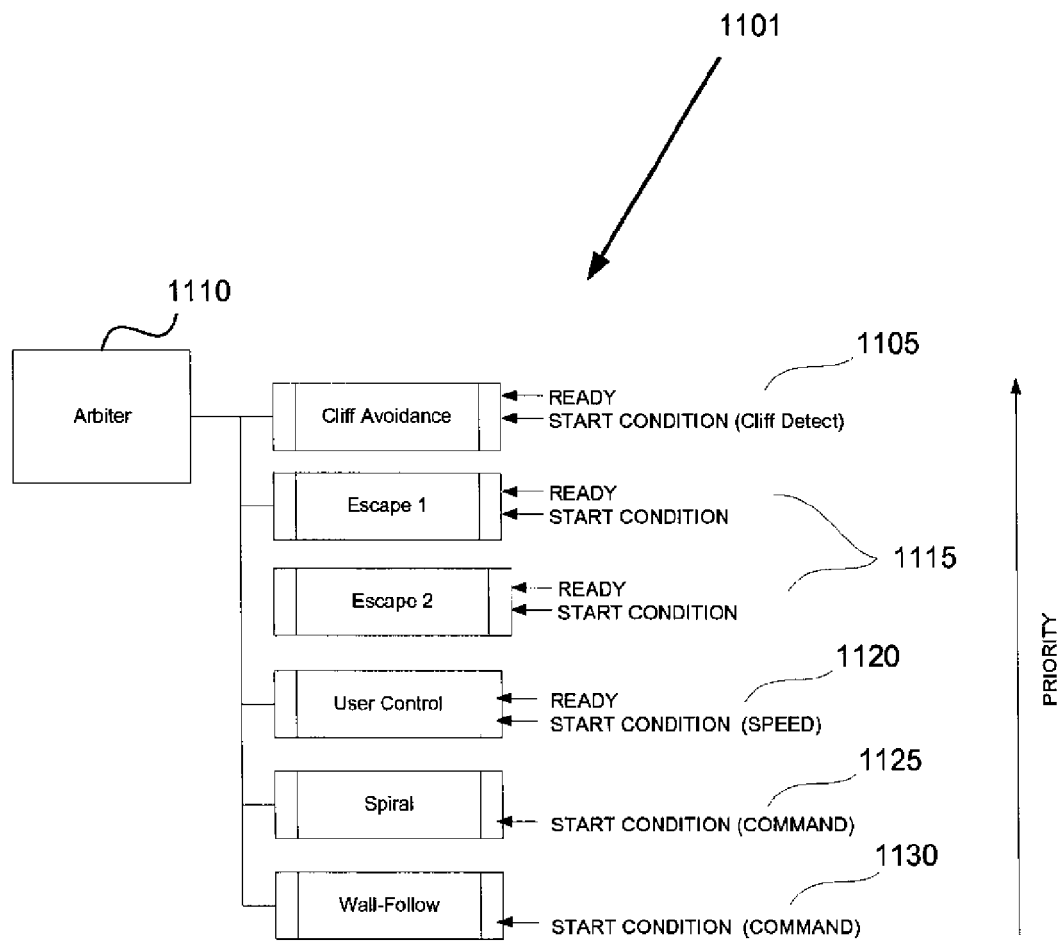
FIG. 21 illustrates a behavior priority schema.

An alternative embodiment may include a robot 1 with a safe mode that further includes a user control behavior that allows the user to operate the robot 1 according to user-generated software routines and user-generated serial commands, while allowing escape and safety behaviors included in the behavior level 386 of the software to execute autonomously and in response to sensor data. Such an embodiment may include a behavior priority schema 1101 such as the schema illustrated in FIG. 21 where safety and escape behaviors such as the cliff avoidance behavior 1105, and a n number of escape behaviors 1115 have a higher priority in the schema 1101 than the user control behavior 1120. In such an embodiment, when the robot 1 is in a safe mode, the arbiter 1110 favors escape and safety behaviors such as cliff avoidance 1105 and other escape behaviors 1115 over the user control behavior 1120 when choosing a behavior to execute. In contrast, the user control behavior 1120 has a higher priority than the spiral behavior 1125 and the wall-follow behavior 1130. Thus, when the robot 1 is in safe mode, the arbiter 1110 substantially always favors the user control behavior 1120 over the spiral behavior 1125 and the wall-follow behavior 1130.

Designation of a safe mode further results in this type of operation when such a designation further alters a start condition associated with the user control behavior 1120. Alternatively, the safe mode may correspond to a software architecture with behaviors 385 that include a status flag designated to represent whether or not a behavior 385 is on, meaning that the status flag indicates whether or not the behavior 385 and its associated software routines may execute. In a safe mode of operation, the behaviors 385 within the behavior level 386 may be altered such that the escape and safety behaviors as well as a user control behavior have status flags that indicate that those behaviors 385 are operable. Furthermore, all behaviors 385 that are not a safety or escape behavior and not the user control behavior may have status flags indicating that those behaviors 385 are not operable.

Figure 12:
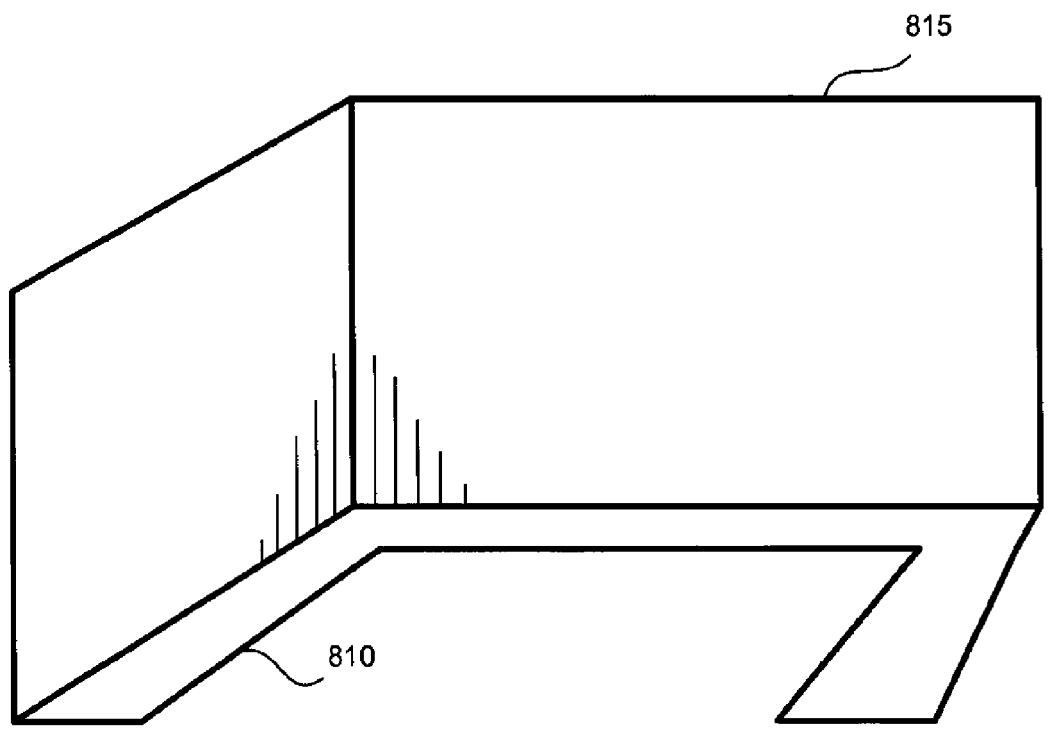
FIG. 12 is an example of a table able to be installed in the main body of the robot development kit, and an illustration of the mating between mounts included on a removable table and mounts included on the bed of a robot development kit.
Figure 12:
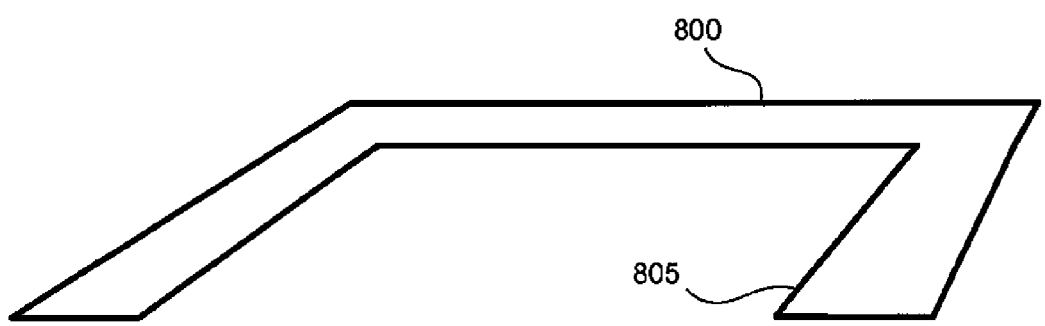

Illustrated in FIG. 12 is a table 800 that includes mounting apparatus 805 that interfaces with a mounting apparatus 810 installed within the bed 35 included within the main body 11. It is advantageous to include a bed 35 able to receive and support an external table 800 because such an ability allows the bed's 35 topography to be easily altered. It is preferred that the table 800 have a uniform height, but alternative versions may include a table 800 having a graduated height that creates an angle with the bed floor 51 that is less than ninety degrees. In a preferred embodiment, the mounting apparatus 810 is installed on the bottom of the bed 35 and along the perimeter of the bed 35. Other embodiments may allow for the mounting apparatus 810 to be installed along the walls of the bed 35.

Figure 13A:
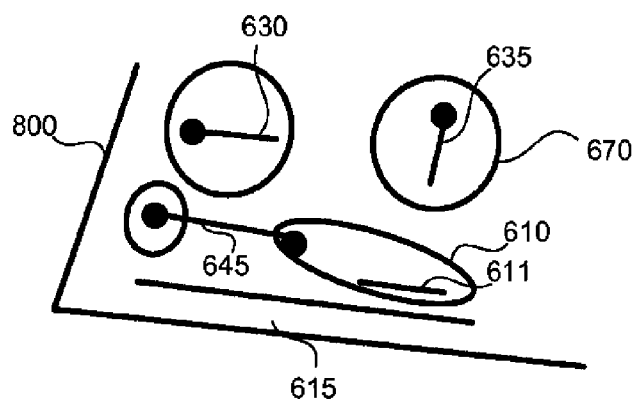
FIGS. 13A through 13C are illustrations of alternative bed arrangements including elongated, raised bosses and circular raised bosses stamped into the bed.
Figure 13B:
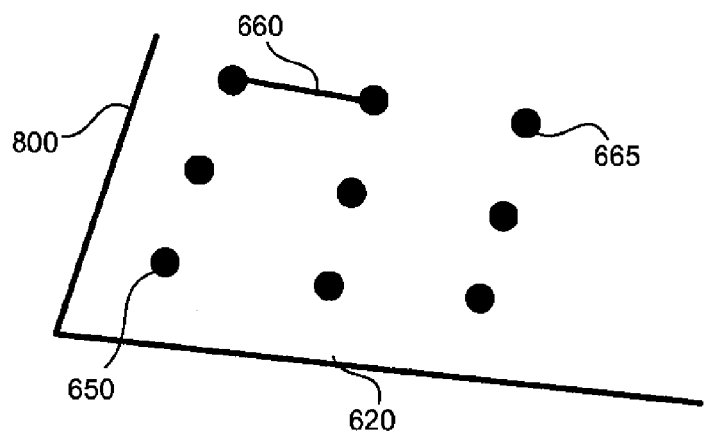
Figure 13C:
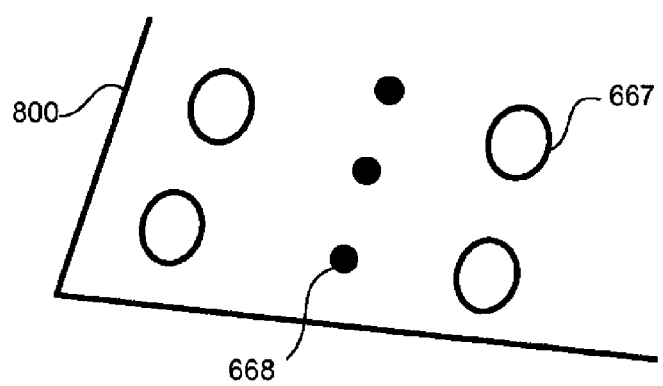

Illustrated in FIGS. 13A through 13C is a first example layout of the bottom of the bed 35. As shown in FIG. 13A, a series of raised and elongated bosses 610 are spaced apart a determined distance and installed on the table 800. Each boss 610 is elongated and has four sides each of which is identical in length to a parallel side. In a preferred embodiment, a boss 610 will be positioned parallel to the boss 610 directly adjacent to it and will have a width 630 within the range of 0.25 to 0.35 centimeters and a length 635 within the range of 2.8 to 2.9 centimeters. The table 800 further includes a gutter 615 that is positioned between the edge of the table 800 and the grouping of bosses 670. Each boss is spaced apart by a pitch 645 which spans a distance within the range of 0.75 to 0.8 centimeters as measured along the short edge of the boss 611 and a pitch 645 that extends from the center of one boss to the center of the adjacent boss.

FIG. 13B illustrates an alternative layout relative to the first example layout of the bed 35 design. Bosses 650 that are raised and substantially circular, are included on the table 800 and are positioned so that each individual boss 650 is parallel to the boss 650 directly adjacent to it. In alternative versions of the alternative layout, the bosses would be substantially cross shaped. A pitch 660 that extends from the center of one boss 650 to the center of an adjacent boss and a pitch 660 that spans for a distance within the range of 1.55 to 1.65 centimeters; separates each boss 650. Each boss 650 has a uniform radius with a measurement within the range of 0.25 to 0.35 centimeters. Included on the table 800 is a gutter 620 positioned between the edge of the table 800 and the group of bosses 665, and a gutter 620 that has a width within the range of 0 to 0.5 centimeters.

Further illustrated in FIG. 13C is another variation relative to the first example layout where the circular bosses 668 are included on the same bed 35 as the elongated bosses 667. As an advantage of having a table 800 which can include combinations of board layouts is that a single table 800 may be able to support external payloads for a wide variety of configurations.

Figure 14A:
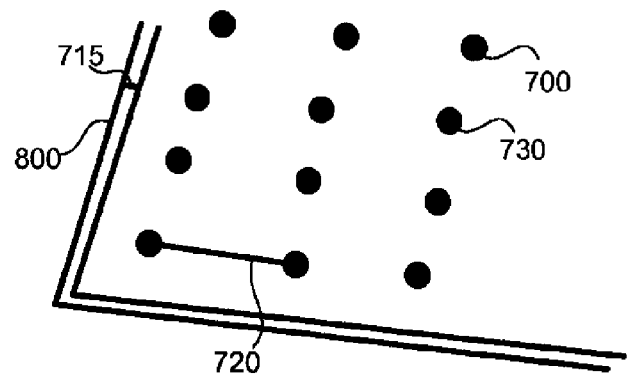
FIG. 14A through 14C are illustrations of alternative bed arrangements including holes drilled into the bed.

Illustrated in FIG. 14 is a second example layout of the bottom of the bed 35. Included on the table 800 shown in FIG. 14A are substantially circular holes 730 with a uniform diameter able to accept an 8-32 fastener. The holes 730 are installed within a table 800 and positioned so that the center of each hole 730 aligns with an adjacent hole. A pitch 720 measured from the center of one hole 730 to the center of the hole adjacent to it and a pitch 720 measuring a distance within the range of 0.25 to 0.75 inches; separates each hole 730. The table 800 includes a gutter 715 positioned between the edge of the table 800 and the groupings of holes 700, and measures a width within the range of 0 to 0.5 inches.

Figure 14B:
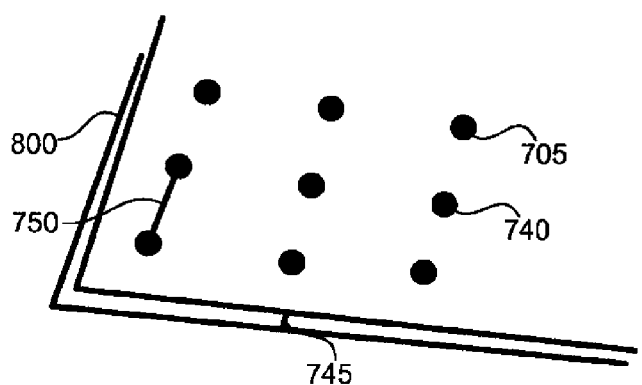

Further illustrated in FIG. 14B is an alternative layout for the second example layout of the bed 35 design that includes substantially circular holes 740 with a uniform diameter within the range of 0.25 to 0.35 centimeters. Each hole 740 is installed within a table 800 and positioned so that the center of a hole 740 aligns with an adjacent hole. A pitch 750 measured from the center of one hole 740 to the center of the hole adjacent to it and a pitch 750 measuring a distance within the range of 1.55 to 1.65 centimeters; separates each hole 740. The table 800 includes a gutter 745 positioned between the edge of the table 800 and the groupings of holes 705, and measures a width within the range of 0 to 0.5 centimeters.

Figure 14C:
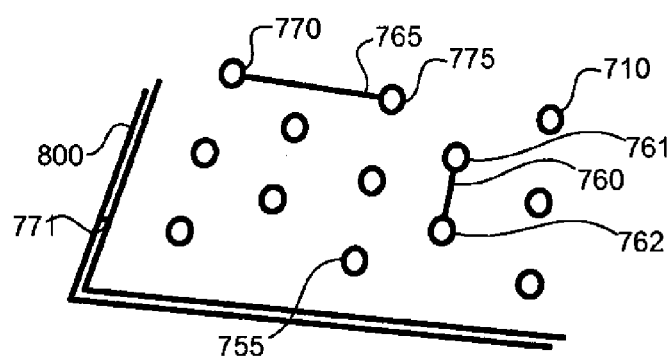

Displayed in FIG. 14C is an additional alternative layout of the second example layout of the bed 35 design that includes substantially circular holes 755 that have a uniform diameter. In a preferred embodiment, the diameter of the holes would be one of either a measurement within the range 0.25 to 0.35 centimeters, or a diameter able to accept an 8-32 fastener. Each hole 755 is positioned so that the hole's center aligns on a horizontal axis with immediately adjacent holes, and so that the hole's center aligns on a vertical axis with a hole two rows down. The holes 755 are positioned on the table 800 such that the horizontal pitch 765 between each hole is a uniform distance, and the vertical pitch 760 between each hole is a uniform distance. In a preferred embodiment the horizontal pitch between each hole would be one of either a pitch with a distance within the range of 0.25 to 0.75 inches, or a pitch with a distance within the range of 1.55 to 1.65 centimeters.

Further included within a preferred embodiment is a vertical pitch between the alternating holes that is one of either a pitch with a distance within the range of 0.5 to 1.5 inches, or a pitch with a distance within the range of 3.1 to 3.3 centimeters. While the horizontal pitch 765 is measured from the center of a hole 770 to the center of the immediately adjacent hole 775, the vertical pitch is measured from the center of a hole 761 to the center of a hole 762 two rows away. The table 800 includes a gutter 771 positioned between the edge of the table 800 and the groupings of holes 710, and measures a uniform width that in a preferred embodiment would be one of either a width within the range of 0 to 0.5 inches or a width within the range of 0 to 0.5 centimeters.

Figure 15:
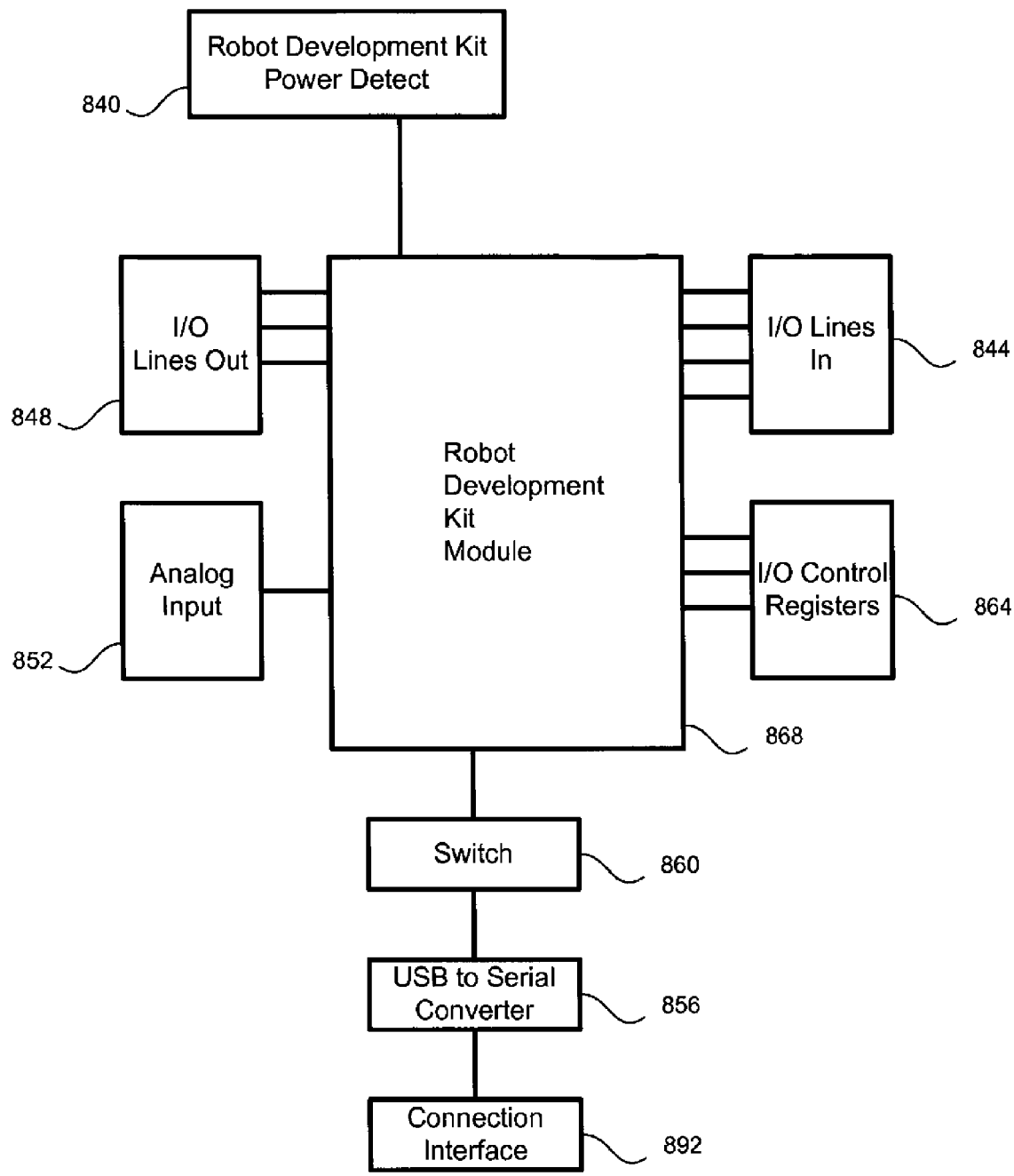
FIG. 15 is a block diagram illustrating data and power interconnections between components of an example RDP.

Illustrated in FIG. 15 is a block diagram of a Robot Development Kit Module 868 included with a Robot Development Kit 900. The Robot Development Kit Module 868 is an external computing apparatus that is able to mate with the mounting apparatus included within the bed 35. Other versions may allow the user to use alternative external computing devices that are able to mate with a mount included within the bed 35 of the robot development kit. To establish communication with the robot, the Robot Development Kit Module 868 includes a connection interface 892 that can mate with the communication port 45 included within the bed 35 of the robot development kit 900. Connected to the Robot Development Kit Module 868 are the following: I/O control registers 864 for controlling components within the Robot Development Kit 900, I/O input lines 844, I/O output lines 848, Analog Input lines 852, a switch 860 for switching between communication between the Robot Development Kit Module and the USB-to-serial converter 856, and a detector 840 for detecting whether or not the Robot Development Kit 900 is powered. The switch 860 is connected to the USB-to-serial converter 856 which is connected to the connection interface 892.

Operation of the Mobile Robot Platform and Development Module

Figure 16:
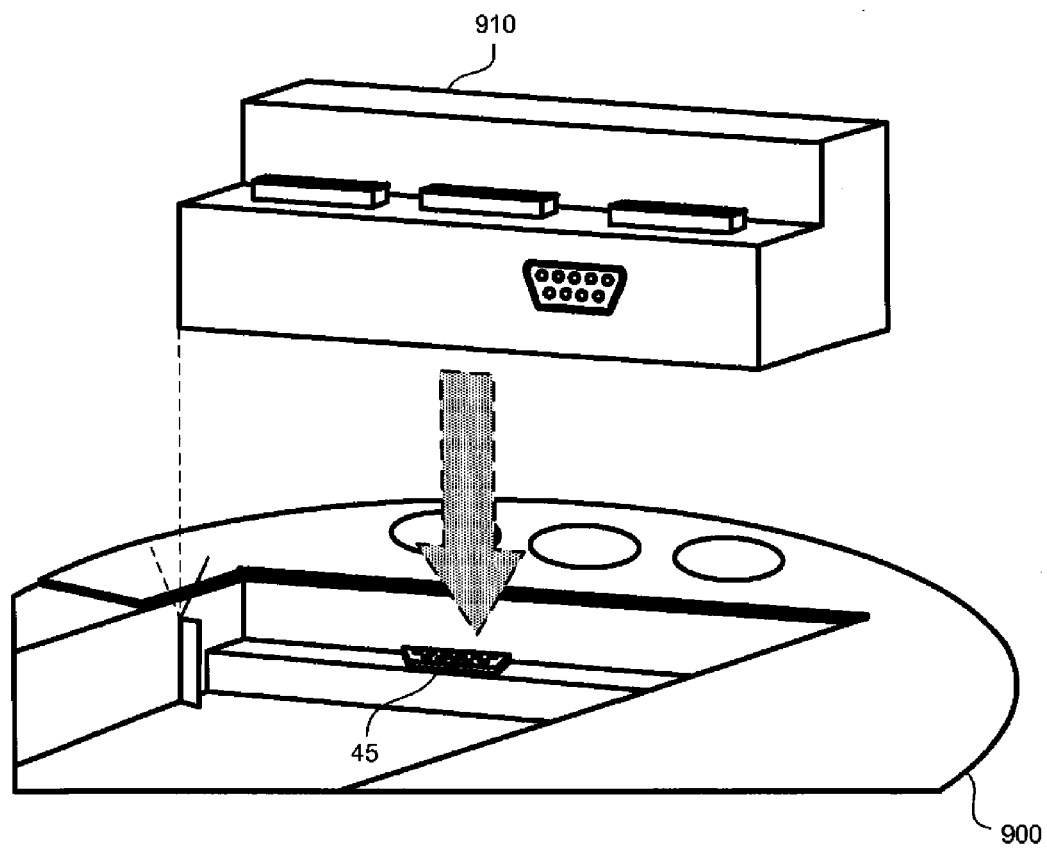
FIG. 16 is a perspective view illustrating inserting an RDKM onto an RDK connector.
Figure 17:
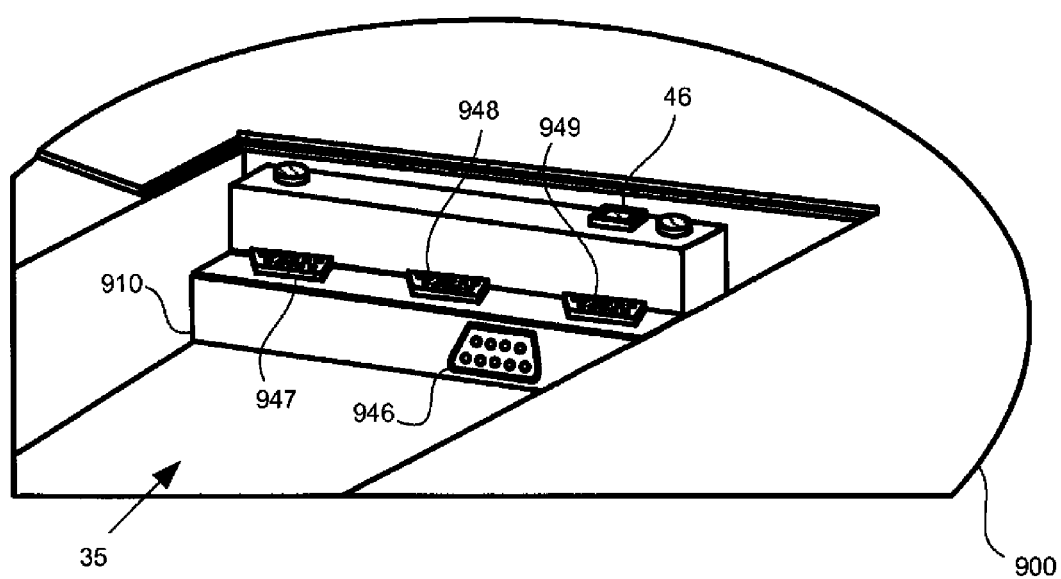
FIG. 17 illustrates an alternative RDKM configuration having multiple ports.

The following discussion relates to non-limiting example implementations of robot development platforms in accordance with various embodiments. As an initial example, a Robot Development Kit Module is described. FIG. 16 illustrates an example of a robot housing structure 900 that functions as a modular robot platform that includes an expansion bay (such as the bed 35) to which a development module (such as the external computing device 910) can be attached. When attached to the bed 35, the connection interface 175 of the external computing device 910 connects to the data port 45 of the robot housing structure 900, which may include one or more additional ports such as the top ports 947, 948 and 949, the cargo bay port 946 (which may be used to control accessory payloads or custom enhancements disposed in the cargo bay 35) or the USB connector 46 (which may be used to communicate with a host computer, such as the user's personal computer). The external computing device 910 preferably includes a module-based processor (such as, for example, an AVR microcontroller) and a memory store containing a set of computer software instructions to be executed on the module-based processor. The modular robot platform also preferably includes an on-board processor or control unit, which may include a processor similar to the module-based processor (such as a microcontroller or other microprocessor); or, alternatively, the control unit of the modular robot platform may include control circuitry implemented as a finite state machine, for example, implemented on a PGA or ASIC device. Also, the modular robot platform includes a drive train, including the motor assembly 310 and differentially driven wheels 110, 112, for locomotion.

In a preferred configuration, the computer software instructions of the development module include software routines developed by a user. The user-developed software routines may by written by the user and compiled into object code or machine code suitable for execution on the module-based processor, using a compiler running on a personal computer or computer workstation, for example. The user can then transfer the executable user-developed routines onto the external computing device 910 using any suitable transfer technique, such as a serial or parallel data cable, a wireless data communication link (such as BlueTooth, Wireless USB, or wireless Ethernet), or by a detachable memory device (such as a USB flash drive, an SD or CompactFlash memory card, or the like), inter alia.

Figure 22:
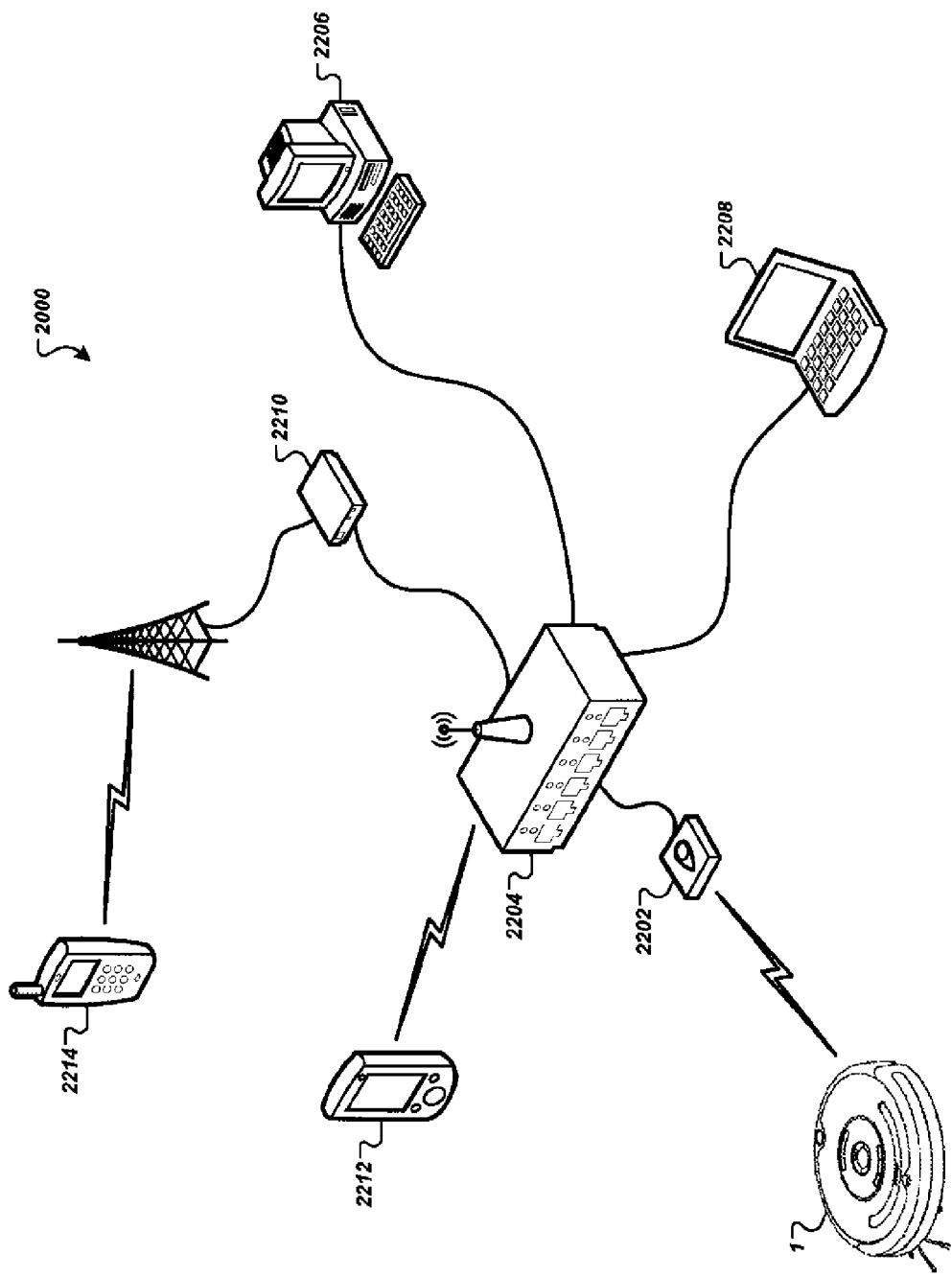
FIG. 22 is a schematic diagram of an example of a robot system.

Further methods of implementing wireless communication between the robot 1 and its corresponding external computing device 910, include implementing a system where a wireless bridge is included within the system and adapted to connect to a home network such that the robot 1 becomes a fully functional network node within the home network. FIG. 22 is a schematic diagram showing an example of a robot system 2000. The robot system 2000 includes the mobile robot 1 and a network data bridge 2202. In this example, a wireless communication component included on the robot 1 receives serial commands from the network data bridge 2202, such as radio-frequency (RF) signals. Typically, these signals may be transmitted by the network data bridge 2202 or other such userside node, which is in turn connected to an Ethernet router/switch/hub 2204 along with several other Ethernet-connected devices such as a home computer 2206, a laptop computer 2208, a cable/DSL/satellite/broadband-adapter 2210 or modem, and e.g. one or more other external computing devices 910 such as a personal digital assistant 2212.

In one example, the network data bridge 2202 which attaches to an Ethernet port on the Internet-connected router 2204 or switch may automatically download a script from a predetermined Internet or local server (e.g., via BOOTP, DHCP, HTTP, FTP, and/or TFTP) thereby providing automatic commands, such as device configuration or diagnostic testing, to be performed. Alternatively or additionally, a user may manage the mobile robot 1 using a device, such as the computer 2206. The Ethernet-attached network data bridge 2202 may provide for configuration and operational functionality via a small, embedded HTTP server built into the firmware of the network data bridge 2202. Devices other than the computer 2206 may also be used to interface with the network data bridge 2202, such as a set-top box, a game console, the PDA 2212, a cell phone 2214, a home server, or any other external computing device 910 operable to communicate with the robot 1 via the web or another network interface.

Further, the network data bridge 2202 may connect wirelessly to the mobile robot 1 and initiate communications therewith. While the Ethernet hub 2204 includes four wired Ethernet ports as well as 802.11 wireless Ethernet connectivity, and although 802.11 or other such wireless networking protocol may be used to communicate with a mobile robot 1 from the base station other than via a network data bridge, in certain implementations, the mobile robot 1 and the network data bridge 2202 use a simple, serialized RF protocol in order to exchange information between the mobile robot 1 and the base station, rather than the full-weight networking protocols.

In certain implementations, the mobile robot 1 may be further simplified by providing receive-only functionality on the mobile robot 1, instead of bi-directional wireless communication support. However, as an alternative, the mobile robot 1 may include full bi-directional wireless communications support in order to transmit information from the mobile robot 1 to the base station (and e.g., to the user, the manufacturer, etc.).

Figure 23:
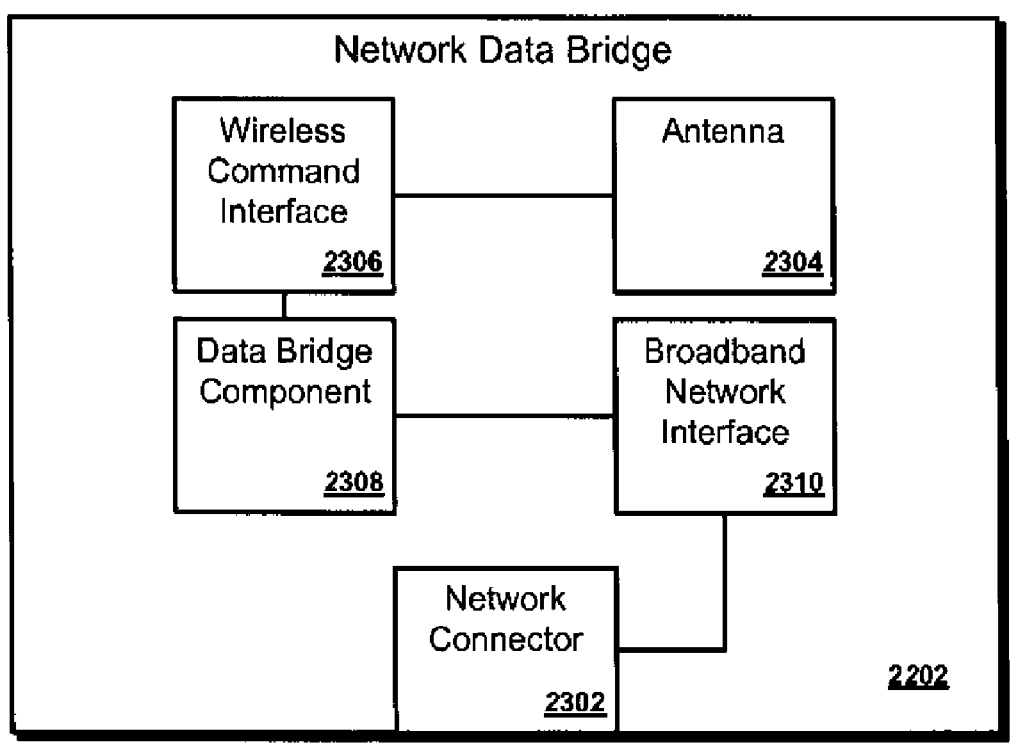
FIG. 23 is a block diagram of a network data bridge.

FIG. 23 is a block diagram showing an example of a network data bridge. The network data bridge 2202 includes a network connector 2302, such as an RJ-11-style male Ethernet connector. Also, the network data bridge 2202 includes an antenna 2304, such as an enclosed, internal antenna, operatively driven by a wireless command interface 2306, which is in turn connected to a data bridge component 2308 (the mobile 1 robot may likewise include an enclosed, internal antenna; alternatively, either the network data bridge 2202 and/or the robot 1 may either one or both include one or more external antennas, either in addition to or in lieu of an internal antenna, for example). The data bridge component 2308 is connected to a broadband network interface 2310 for managing and converting inbound and outbound broadband-side data (such as Ethernet, 802.11b, and/or TCP/IP packets) to and from to a wireless-side simplified networking protocol. The data bridge component 2308 extracts serial commands received by the broadband network interface 2310 and broadcasts the commands via the wireless command interface 2306 and the antenna 2304, using the RPAN protocol.

Preferably the network data bridge 2202 is plugged directly into the owner's broadband router 2204 such that the network data bridge 2202 acquires network information from a DHCP server or optionally configured by an advanced user. In one implementation of this preferred version, the wireless data bridge 2202 may include a female port into which an Ethernet patch cable (or other such networking cord) plugs into from a suitable network connection point, and/or into which an interface portion of a home robot attaches, for example. As examples of such a system as described hereinabove, these communication channels provides a mechanism for retrieving sensor data and sending commands to robots in the field by piggy-backing on their broadband connection. Such a bi-directional communication system allows deployment of online services and to retrieve sensor data from a manufacturer's installed base for improved customer service and system characterizations. It may further increase the manufacturer's comprehension of how robots and individual subsystems perform in the field.

Interaction the network-enabled mobile robot(s) 1 in a customer's home may take place through a web browser, in accordance with certain embodiments. Web browser access provides support for robot interaction via non-PC devices (e.g., cell phones, and PDAs) with compliant browsers.

Figure 24A:
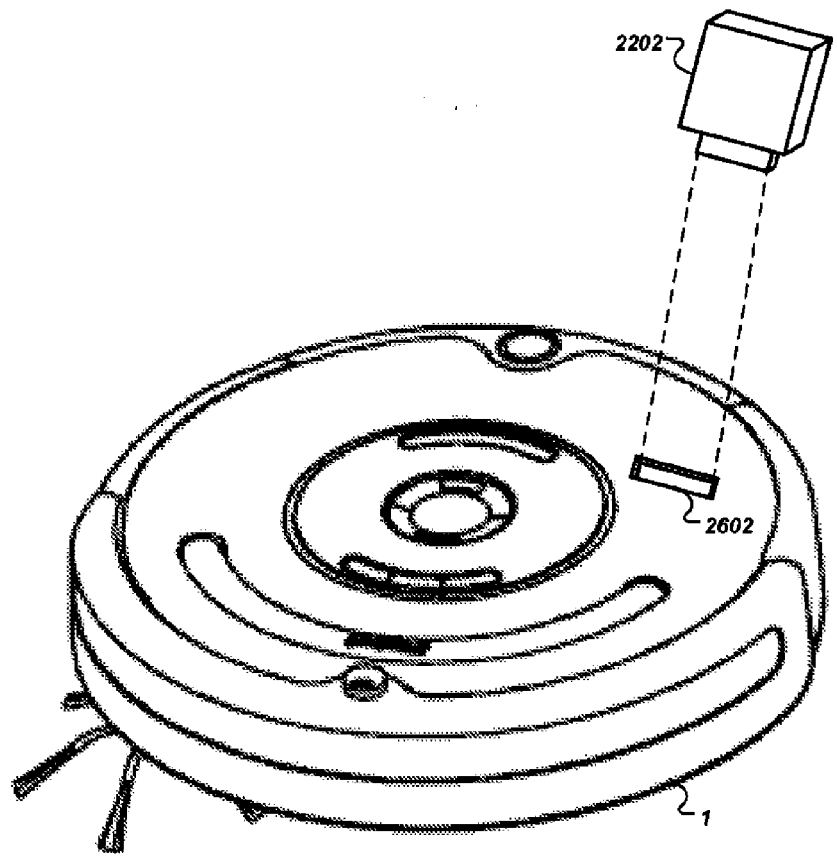
FIG. 24A is a schematic diagram of a mobile robot including a network data bridge.

FIG. 24A is a schematic diagram showing an example of the mobile robot 1 that includes the network data bridge 2202. In this example, the network data bridge 2202 is a card that is inserted into an interface slot 2602 in the mobile robot 1. This type of network data bridge may be self-contained and transport data on constituent RAM, ROM, Flash, or EEPROM, type storage devices (which might be loaded with software, video, or audio content either at a user's computer equipped with a special writing unit or at the manufacturer in order to provide content such as themed content, for example); or can be loaded with code number(s) that authorizes a wireless download to the network data bridge 2202; or, alternatively, may be connected to a network via a wire or by wireless Ethernet, for example.

Figure 24B:
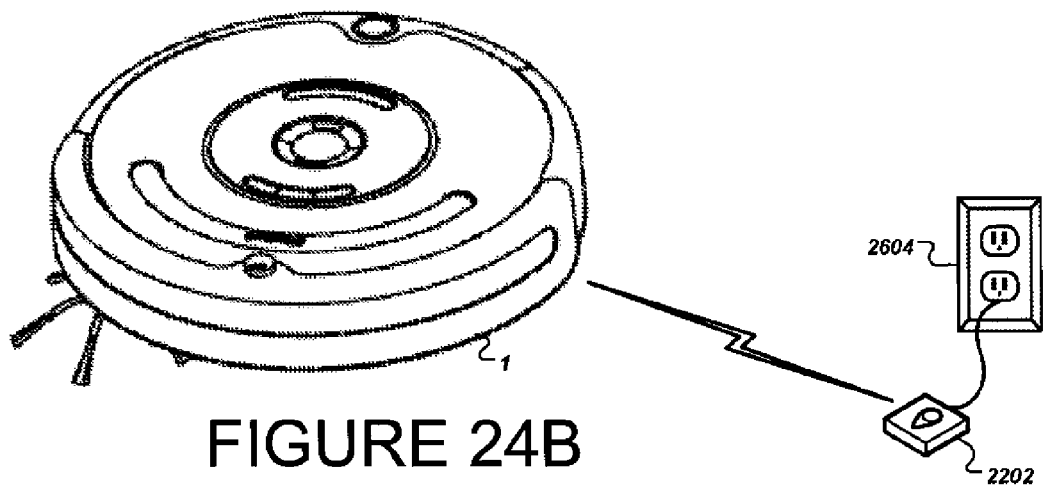
FIG. 24B is a schematic diagram of a mobile robot and a network data bridge that connects to other networks via power lines in a building.

FIG. 24B is a schematic diagram showing an example of the mobile robot 1 and an example of the network data bridge 2202 which connects to other networks via a network that runs over power lines in a building. The network data bridge 2202 may be configured to plug into a standard power outlet 2604 and to participate with a home power-line network, for example, in homes or markets where Ethernet networking components are not available. Alternatively, the network data bridge 2202 may plug into a standard telephone wall jack in order to communicate via a home telephone wiring network, for example. In certain implementations, the network data bridge 2202 might be plugged into any of an Ethernet port, the power socket 2604 or a telephone wall jack, and auto-negotiate a connection to the Internet (if available) and/or to the mobile robot(s) 1. To this end, many "Ethernet-over-home power lines" and similar schemes or products are widely produced and well known in the art; for example, as an early commercial endeavor in this technology area, the X10 communication standard permits communication over power lines by encoding a single bit of information at each zero-point in the 120 V(RMS) @ 60 Hz power cycle common in North America, for example, and many more modern Ethernet-like power line networking systems are commercially available, in which each networked device connects to the network typically via an electrical socket on a wall. A common feature is that the network data bridge extracts the serial commands and data from encapsulating broadband protocols (Ethernet, TCP/IP, 802.11x) for transmission on the local wireless robot network (RPAN), and similarly encapsulates such commands and data from the RPAN for transmission on the broadband network.

The wireless data bridge 2202 may provide web server functionality and serve static or dynamic web content corresponding to enabled mobile robots 1 belonging to the mobile robot user. Such web server functionality may be provided on the mobile robot user's local broadband network and e.g., be broadcast discoverable using TCP/IP, UDP, Ethernet, SNMP, NetBEUI, IPX, SMB or uPnP broadcast network announcing, for example, in order to be found by mobile robot users when browsing the local area network; alternatively, a static network address (such as a standard, pre-set IP address) may be assigned to the data bridge 2202 such that users may simply type the static network address into a web browser to reach the web server on the network data bridge 2202. The web content may be active or static, and may be tailored to the functionality to be provided and/or may be updated via the Internet or local network.

Wireless bandwidth (especially in unlicensed bands such as 900 MHz, 2.5 GHz, or any other such suitable public RF band) is by its nature limited, and because the presence of multiple RF devices (such as, for example, multiple mobile robots and/or network data bridges; WiFi, BlueTooth, X10, mobile or portable telephone or other common wireless devices; and/or interference from sources such as solar flares, RF discharge from electrical lines, florescent lights, or any other RF-interfering entity) may further restrict the effective amount of bandwidth or the degree of reliability of bandwidth available for wireless mobile robot communications, reliability and postponement measures may be taken to enhance the functionality of the network data bridge 2202 and/or the mobile robot 1; conversely, the network data bridge 2202 and/or the mobile robot 1 may be configured to reduce their consumption of available bandwidth in order to give priority to other wireless devices. For example, regarding the reliability of the wireless robot network communications, techniques such as cyclic redundancy checking (CRC) and/or hash routines (such as, MD5 sums or CRAM) or other appropriate reliability techniques (such as parity or error correcting codes (ECC)) may be employed on either the data bridge-to-robot channel and/or the Internet-connected channel (e.g., on the Ethernet-to-data bridge channel). Furthermore, to limit the use of valuable bandwidth during business or other peak usage times, the network data bridge 2202 and/or the mobile robot 1 may be scheduled to transmit theme content, usage/behavior data, or any other such communication during nighttime or off-peak times; alternatively, for example, the network data bridge 2202 and/or the mobile robot 1 (and/or the manufacturer's server) may be scheduled to perform their communication (or the bulk of their communication) at an automatically detected off-peak usage time, by detecting when bandwidth usage is lowest (either in real-time or by collecting data of bandwidth usage-per-time-of-day over a series of days or weeks and then determining the generally least used times of day, as non-limiting examples). Reliability measures may be taken at either the network or application layer or both, for example, or at any other suitable layer in a communication stack (such as the data bridge using UDP on the Internet for simplicity and non-critical communications, but the web server using full error-checking, reliability and/or error correction measures, windowing, etc.).

In addition to RF-band wireless communication, the network data bridge 2202 (and/or the mobile robot 1 or a peripheral device) may transmit via other suitable frequencies and/or bands in the electromagnetic spectrum, such as the 900 MHz, 2.4 GHz, microwave frequencies, or other suitable bands. To alleviate interference that may occur in these or the RF or another band, the mobile robot 1 and/or the network data bridge 2202 may employ frequency shifting, spread spectrum, sub-channel technologies, and/or other such interference-avoidance schemes or techniques for avoiding interference with other unlicensed RF applications (phones, baby monitors, etc.).

An RF system used by the mobile robot 1, the network data bridge 2202, the remote control, and/or the peripheral device may include four radio transceiver modules that are located in the mobile robot 1, the remote control, the peripheral device, and the network data bridge 2202. The remote control may use RF to transmit control signals to the mobile robot 1 using a bidirectional protocol or unidirectional protocol; also, the remote control unit may allow the user to "drive" the mobile robot 1 around as well as sending scheduling data created on the remote control unit. The mobile robot 1 may use RF to wake-up and power-manage the peripheral device using a bidirectional protocol. The network data bridge 2202 may use RF to transmit data and code updates to the mobile robot 1 as well as to upload diagnostic data from the mobile robot 1 using a bidirectional protocol. Furthermore, when there are multiple peripheral devices as well as the network data bridge 2202 in operation, in which the peripheral devices and the network data bridge 2202 can maintain an RF or other communication channel in a relayed fashion, the wireless robot network communication between the network data bridge 202 and the mobile robot 1 may be propagated along the chain of peripheral devices even when the mobile robot 1 is beyond the direct RF range of the network data bridge 2202. The effective range of the wireless robot network can be extended by the linking of peripheral devices.

Another additional embodiment may include a robot system where the wireless bridge 2202 has the ability to implement communication using the BLUETOOTH communication standard where the serial data packets transmitted from an external computing device to the robot 1 and from the robot 1 to the external computing device can be further characterized as BLUETOOTH packets that transmit from a transmitter to a receiver using a short range frequency. Alternatively the system can be configured to operate either using BLUETOOTH packets to transmit the serial data from the robot 1 to the external computing device or using an internet protocol to transmit the serial data from the robot 1 to the external device using a wireless local area network. A further alternative to the above method of implementing a remote system of an external computing device and a robot 1 is described in the following U.S. utility patent application Ser. No. 10/718,199, entitled "DECENTRALIZED OPERATING SYSTEM" and filed on Nov. 20, 2003, the contents of which are incorporated by reference herein.

Furthermore, the robot housing structure 900 preferably includes a set of computer software instructions suitable for execution by the on-board processor. The computer software instructions of the robot housing structure 900 include routines for controlling the components of the robot housing structure 900 (such as the drive train) in accordance with predetermined robot behaviors and/or robot actions, and in a preferred configuration, are developed by the manufacturer of the robot and stored in a protected or non-volatile memory. As an advantage, because the software instructions for performing basic functionality (such as robot behaviors and robot actions) are generally protected from erasure or being overwritten by the user, there is little risk of a user irreparably damaging the functionality of the mobile robot platform.

The robot behaviors encoded in the computer software instructions of the mobile robot platform typically include functionality or control procedures that may be autonomously executable (that is, which may be successfully executed on the on-board controller without necessarily relying on the presence of the robot development module), and may also be concurrent (able to be executed by the on-board controller in parallel with another such routine) or involve a significant aspect of feedback (such as from sensors disposed on the robot housing structure 900). Examples of such robot behaviors include: a cliff-avoidance behavior that runs continuously and concurrently with user-provided commands, monitoring the cliff-detectors of the robot housing structure 900, and which can intercede or interrupt execution of the user-provided commands when appropriate to avoid falling off a cliff; or a an obstacle-avoidance behavior that monitors forward-looking sensors for obstacles in the path of the robot and which can automatically modify the navigational actions of the robot to circumnavigate a detected obstacle, without requiring any interaction with a user-developed program on the external computing device 910. Alternatively, the robot development module may override any such autonomous or inherent mobile robot platform-based behaviors, or modify the relative priority of such behaviors in the control hierarchy.

As an advantage, user-developed programs or commands may remain simple, without requiring the user to provide specific instructions for performing the functionalities of the platform-based behaviors. Rather, the user may choose to provide only basic commands (such as "go forward 20 feet") in the user-developed software of the robot development module, and the complex functionalities of the platform-based behaviors can automatically respond to modify the user-provided command when triggered by the appropriate circumstances (e.g., the cliff-avoidance behavior may halt the robot before the robot has proceeded the full 20 feet instructed by the user command, in order to avoid hurtling over the threshold of a steep precipice when the cliff-detectors sense the presence of the precipice).

The robot actions may generally be comparatively simple, relative to the above-described robot behaviors, and may typically involve less concurrency. One example of a robot action pertains to a movement vector, in which a user-provided directive instructs the robot to move a particular distance in a particular direction, in which the distance and angle of the direction to be traversed are specified in the user-provided directive. Such a robot control signal may be referred to as a parameterized navigational operation, in which the robot is instructed to navigate according to the parameters provided pursuant to the robot control signal. As additional examples of robot actions, a routine encoded in the mobile robot platform-based software instructions may cause the robot to read a sensor register and report it to the robot development module, or to initiate a hardware timer on-board the mobile robot housing 900. In another example, a compound robot action may include instructions to execute two or more other robot actions; also, robot behaviors may include one or more robot actions as constituent sub-routines.

In accordance with one example, communication between the robot development module and the mobile robot platform takes place in accordance with a robot interface protocol, in which control instructions and data are encoded for transmission via the connection interface 175 and data port 45. By formatting or encoding such inter-component communication using the robot interface protocol, the functionality of the development module and mobile robot platform can be clearly defined and, as an advantage, various different varieties of robot development modules or mobile robot housings can be made to function interchangeably, for example. Further, the functionality of the mobile robot platform (such as the robot housing structure 900) can be effectively encapsulated and segregated from user-developed software provided on the robot development module (such as the external computing device 910) in order to prevent unintended modification of the robot control routines of the mobile robot platform. When a command or data is received by the mobile robot platform, the mobile robot platform may then translate, decode, and/or process the transmitted item in accordance with a suitable processing scheme, such as any of the above-discussed computer software organization and virtualization technologies (see FIGS. 8, 9, 10 and 11, for example).

In a preferred example, the robot interface protocol defines a set of operations that the robot development module can transmit as commands to the mobile robot platform, as well as any necessary or optional parameters or data corresponding thereto. For example, the external computing device 910 may transmit a robot control signal to the robot housing structure 900 corresponding to the above-discussed movement vector, and then transmit another signal specifying the distance and direction angle to be traversed by the robot, by encoding the robot control signal and corresponding data into the robot interface protocol and sending it over the interface connector 175 to the data port 45 of the robot housing structure 900. As another example, the external computing device 910 may send another robot control signal that instructs the robot housing structure 900 to report a value from a particular sensor disposed on the robot housing structure 900. The robot housing structure 900 would respond by sampling the appropriate sensor, processing the sensor reading from an analog value to a digital value if appropriate, encoding the response in accordance with the robot interface protocol, and transmitting the encoded response back to the external computing device 910 via the data port 45 and interface connector 175.

The robot interface protocol preferably defines a datagram or data packet, which may include a word size definition (such as an 8 bit word size, as a non-limiting example) and/or handshake, signaling or cyclical redundancy check (CRC) codes to establish and verify communications. The datagram definition may be similar to a SLIP (serial-line internetworking protocol) packet, a USB datagram, or any other suitable protocol for communicatively interfacing two electronic components. In accordance with one example, the robot interface protocol may specify a unique datagram corresponding to each robot action available for operation on the mobile robot platform; the robot interface protocol may also define a control signal for overriding one or more robot behaviors of the mobile robot platform. In another example, the robot interface protocol may exclude any instructions for overwriting or irreversibly modifying one or more of the computer software instructions of the mobile robot platform; or, alternatively, may include a signal for "unlocking" the computer software instructions of the mobile robot platform to be freely altered by instructions from the robot development module.

As discussed above, in at least some configurations, the processor or controller of the mobile robot platform may concurrently execute two or more robot behaviors or robot actions. However, in order to maintain coherent operation of the mobile robot platform, an arbiter 382 (see FIG. 9, for example) may run as a separate thread of execution on the processor or controller (or, as an alternative, may be provided as a distinct component disposed on the mobile robot platform). The arbiter 382 preferably selects one of the concurrently running robot behaviors, and control of the physical components of the mobile robot platform is then permitted only to the selected robot behavior, while the non-selected robot behaviors continue executing "silently" or "virtually" (e.g., without being granted actual control of the mobile robot platform). In order to select the most appropriate robot behavior or robot action, each concurrently operating robot behavior or robot action may be assigned a priority value (such as, for example, an integer value), and a selection algorithm then selects the robot behavior or robot action having the highest priority value. Further, the priority values for the robot behaviors or robot actions may be assigned or modified in accordance with the selection algorithm, or by an external agent (such as, for example, a robot control signal received by the mobile robot platform from the robot development module that instructs to assign a particular robot behavior a specified priority value).

Figure 18:
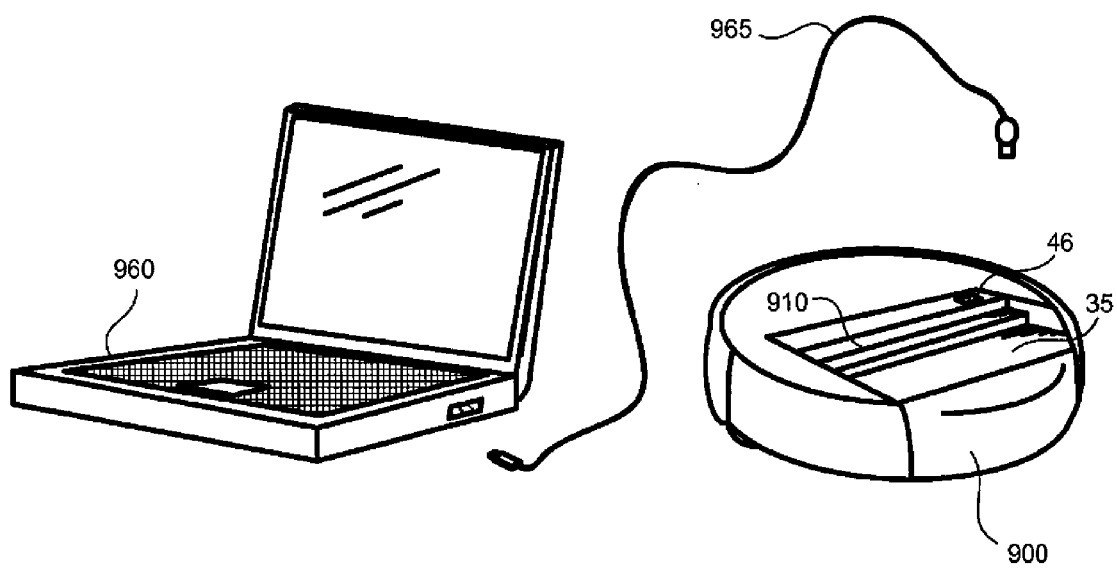
FIG. 18 illustrates connecting the RDKM to a computer's USB port.

In the following two examples, a mobile robot platform is provided as a robot housing structure 900 illustrated in FIG. 1 and a robot development module is provided as an external computing device 910 illustrated in FIG. 4(A). Various features not specifically discussed may be similar to any of the above-discussed features; or, alternatively, may be implemented in accordance with any suitable structure or technique. Also, in the following examples, as illustrated in FIG. 18, the software code may be written in C by the user on a personal computer such as the notebook computer 960, which is then compiled by the user into executable or object code that the user transfers to the external computing device 910 using a suitable interface, such as the USB cable 965 connected to a USB port 1001 provided on the external computing device 910.

The function byteTx( ) described below is defined to transmit a single byte of information over the interface connector 175 of the external computing device 910, which is then received by the data port 45 of the robot housing structure 900 connected thereto and processed by the processor or controller of the robot housing structure 900. Conversely, the function byteRx( ) is a command to receive a byte of data from the interface connector 175. Also, the variables beginning with capital letters—such as UCSR0A and UDR0—are special system values corresponding to system registers of the external computing device 910, used to set up, read, or control various aspects of the serial communication process (such as establishing a baud rate, or polling the value of a receive buffer).

The C code in the examples below, once completed and combined with a proper project file, compiled and transmitted to the external computing device 910, may be executed by the module-based processor (but, in the present exemplary embodiment, is not executed by the processor of the robot housing structure 900, which instead receives commands transmitted by the external computing device 910 as transmitted over the interface connector 175).

Example

Commanding the Robot to Move

In this example, a series of datagrams—which form a robot control signal in accordance with a robot interface protocol—are transmitted by the external computing device 910 via the interface connector 175 in order to command the robot housing structure 900 to perform an action corresponding to the transmitted sequence of datagrams. In this case, the robot control signal resulting from the example C code instructs the robot housing structure to control the drive train so as to propel the robot directly forward at the specified average speed:

```
byteTx(137);      /* "drive" datagram   */
byteTx(0x01);     /* velocity high byte */
byteTx(0x2C);     /* velocity low byte  */
byteTx(0x80);     /* radius high byte   */
byteTx(0x00);     /* radius low byte    */
```

In the above example C code, the initial byte transmitted corresponds to the datagram (of 1 byte in size) specifying "move," in accordance with a robot interface protocol for the present example. After the initial datagram, two parameters are subsequently transmitted, in which each parameter comprises a 16-bit value divided into two 8-bit datagrams. The velocity parameter is specified as the base-16 (hexadecimal) value "0x012C" (which equals "300" in base-10 (decimal)). The fourth and fifth lines of C code in this example send a radius value of 0x8000, which is a special value indicating that the robot should move in a straight path (without any radius of curvature).

As an additional example of robot movement code, the following C code causes the external computing device 910 to transmit a robot control signal that makes the robot move backward at 100 mm/s along an arc with a turning radius of 500 mm:

```
byteTx(137);      /* "drive" datagram   */
byteTx(0xFF);     /* velocity high byte */
byteTx(0x9C);     /* velocity low byte  */
byteTx(0x01);     /* radius high byte   */
byteTx(0xF4);     /* radius low byte    */
```

Looking to the initial line of code, a datagram is sent comprising the byte corresponding to the binary (base-2) encoding of the base-10 number 137. This datagram corresponds to the root control signal for drive or movement, in accordance with the present example robot interface protocol. Next, the parameters of this parameterized movement operation are transmitted. The velocity of −100 as a signed 16 bit hexadecimal number is 0xFF9C, sent as the second and third bytes; and the radius of 500 becomes 0x01F4 as a 16-bit hexadecimal number.

Example

Reading a Sensor on the Robot Housing Structure

This example C code fragment illustrates how a user may program the external computing device 910 to retrieve a sensor value from a sensor disposed on the robot housing structure 900, which can provide feedback for a robot control program. To read the latest sensor information from the robot housing structure, store it into an array, and then check whether a cliff is detected, the following code may be used:

```
uint8_t   i;
uint8_t   sensor[26];       /* array for sensor data */
while(UCSR0A & 0x80)        /* clear the receive buffer */
    i = UDR0;
byteTx(142);                /* sensor opcode */
byteTx(0);                  /* send all sensor data */
for (i = 0; i < 26; i++)
{
    sensor[i] = byteRx;     /* read each sensor byte */
}
if(sensor[2] || sensor[3] || sensor[4] || sensor[5])
{
    /* a cliff is detected */
}
else
{
    /* no cliff detected */
}
```

As an alternative, if not all the sensor information is required from the robot housing structure 900, a subset thereof may instead be requested, by sending a different sequence of datagrams over the interface connector 175.

General Nature of Examples

With regard to the present invention and each of the embodiments or examples discussed hereinabove, although reference has been made to, inter alia, the All are contemplated and understood as embodiments of the present invention. All examples herein are non-limiting examples. Co-coordinating conjunctions such as "and/or" apply to all members of a list.

It should be noted that the system can be used or configured solely for any of the discrete functions described herein, or in any combination thereof. The features of the different embodiments are considered to be combinable together.

The invention claimed is:

1. A robot comprising:
   a proximity sensor directed toward a forward end of a chassis of the robot;
   a cliff sensor positioned toward the forward end of the chassis;
   a sensor circuit connected to the proximity sensor and to the cliff sensor;
   an I/O circuit including at least one input and one output;
   at least one external computing device having a connection interface to the chassis;
   a control circuit including a microprocessor and connected to the sensor circuit and to the I/O circuit;
   a communication port provided within the chassis and configured to connect the connection interface of the at least one external computing device to the control circuit via the I/O circuit; and
   a computer memory configured to store robot control instructions executable by the control circuit, the robot control instructions including a command interpreter routine and a serial input handler,
   wherein the command interpreter routine is configured to cause the control circuit to receive one or more formatted commands via the communication port and to respond to the one or more formatted commands by initiating the serial input handler, and
   wherein the serial input handler is configured to cause the control circuit to communicate with the proximity sensor, the cliff sensor, the I/O circuit, the sensor circuit, and the communication port.

2. The robot of claim 1, wherein the control circuit, the communication port and the computer memory are disposed in a detachable module configured to detachably connect to a bed of the chassis.

3. The robot of claim 1, further comprising:
   a motorized drive system including a drive virtualization level;
   at least one obstacle sensor including a sensor virtualization level; and
   a command input routine configured to relay data command packets to one or more serial input handlers, the serial input handlers configured to interpret header arguments of data command packets and responsively do one or both of:
   (i) execute one or more sensor virtualization routines configured to retrieve and format native sensor data into digital logic signals, and/or
   (ii) execute one or more drive virtualization functions configured to retrieve and format bearing and speed navigation instructions into native motor control signals.

4. A robot comprising:
   a chassis configured to detachably receive at least one external computing device; and
   a control circuit connected to a sensor circuit and an I/O circuit, the control circuit including a microprocessor and a computer memory, the computer memory configured to store robot control instructions executable by the microprocessor, the robot control instructions including:
   a command interface configured to receive one or more external commands from the at least one external computing device and to convert the external commands into internal control values, each external command including a header argument;
   a sensor virtualization level including a plurality of virtual sensor functions corresponding to a sensor and configured to retrieve native sensor data and to convert the native sensor data into sensor logic levels associated with the native sensor data; and
   a drive virtualization level including a plurality of virtual drive functions configured to convert the sensor logic levels and the internal control values into a set of native motor controls.

5. The robot of claim 4, further comprising:
   a command input routine configured to relay commands to serial input handlers that are configured to interpret the header arguments of communication data packets
   and responsively call sensor virtualization routines that retrieve and format native sensor data into digital logic signals;
   a set of predefined behaviors, each predefined behavior configured to control a motorized drive system in accordance with a finite state machine including
      a sensor routine configured to monitor sensor virtualization function output and the serial input handlers for events,
      a drive routine configured to actuate one or more virtual drive functions configured to convert bearing and speed navigation instructions into motor control signals, and
      a response routine configured to respond to an arbiter, allowing the behavior to operate the virtual drive functions, the set of predefined behaviors including an obstacle avoidance behavior configured to monitor an obstacle sensor virtualization function output, to actuate one or more virtual drive functions configured to move the robot substantially away from a detected obstacle, and to provide telemetry information regarding the detection and avoidance of the obstacle.

6. The robot of claim 5, wherein the behaviors operate based on a set of modes, each mode corresponding to a state in which the robot can operate, and being configured to execute in parallel with one or more of other modes.

7. A robot comprising:
   a robot platform including a sensor, a drive train, an on-board controller, an expansion bay, and a first data communication port, the on-board controller including a first set of computer software instructions configured to communicate via the first data communication port in accordance with a predetermined robot interface protocol, to receive and process input from the sensor, to operate the robot platform in accordance with one or more robot behaviors, and to operate the robot platform to perform one or more robot actions; and
   an external computing device configured to detachably interface with the robot platform and including
      a programmable processor, a second data communication port configured to interface with the first data communication port, and a computer memory, a second set of computer software instructions configured to transmit a first robot control signal to the robot platform in accordance with the robot interface protocol, the first robot control signal corresponding to at least one robot action or robot behavior, and a third set of computer software instructions configured to transmit a second robot control signal querying the sensor of the robot platform in accordance with the robot interface protocol and to receive sensor data from the robot platform;

wherein the robot platform is configured to perform the robot behavior corresponding to the first robot control signal; and wherein the robot platform is configured to transmit sensor data to the external computing device in accordance with the robot interface protocol.

8. The robot of claim 7, wherein the first and second data ports are configured to communicate in accordance with a serial data communication protocol selected from the group consisting essentially of RS-232, USB, IEEE 1394, or 1.sup.2C.

9. The robot of claim 7, wherein the robot platform further comprises:

first and second differentially driven drive wheels configured to propel the robot platform and disposed at first and second laterally opposed positions on the robot platform across a central longitudinal axis of the robot platform, the external computing device having a lateral position substantially between the first and second wheels.

10. The robot of claim 7, further comprising:

an auxiliary component including at least one of a sensor and an actuator, the auxiliary component being configured to connect to the robot platform.

11. The robot of claim 10, wherein the auxiliary component communicates with the robot platform in accordance with the robot interface protocol.

12. The robot of claim 11, wherein the robot interface protocol comprises:

a first set of datagrams configured to operate the robot platform of a corresponding robot action; and a second set of datagrams configured to establish communication in accordance with the robot interface protocol.

13. The robot of claim 12, wherein the robot interface protocol further comprises a datagram configured to override at least one of the robot behaviors.

14. The robot of claim 7, wherein the second and third sets of computer software instructions are generated by a user using a computer programming language and installed to the robot by the user.

15. The robot of claim 7, wherein the robot interface protocol does not include a datagram capable of altering the first set of computer instructions on the robot platform.

16. The robot of claim 7, wherein the robot behaviors include at least one safety behavior configured to prevent the robot from performing a robot action that damages the robot.

17. The robot of claim 7, wherein the on-board controller is configured to execute a plurality of robot behaviors concurrently, wherein the first set of computer software further includes an arbitration routine configured to select one robot behavior among the concurrently executing robot behaviors based on a priority determination routine, and wherein the on-board controller is further configured to control the robot based on the selected robot behavior.

18. The robot of claim 17, wherein the first robot control signal is configured to alter the selection of the arbitration routine.

19. The robot of claim 7, further comprising a plurality of parameterized navigational operations having one or more quantitative parameters, wherein the robot interface protocol includes a predetermined specification for transmission of the one or more quantitative parameters corresponding to the parameterized navigational operation.

20. The robot of claim 19, wherein the first robot control signal includes a parameterized navigational operation, and wherein the on-board controller of the robot platform is further configured to process the first robot control signal and to control the drive train in accordance with the first robot control signal.

* * * * *